United States Patent
Fok et al.

(10) Patent No.: US 8,176,167 B2
(45) Date of Patent: May 8, 2012

(54) METHODS AND APPARAUS FOR REQUESTING WIRELESS COMMUNICATION DEVICE PERFORMANCE DATA AND PROVIDING THE DATA IN OPTIMAL FILE SIZE

(75) Inventors: Kenny Fok, San Diego, CA (US); Eric Chi Chung Yip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1006 days.

(21) Appl. No.: 11/741,866

(22) Filed: Apr. 30, 2007

(65) Prior Publication Data

US 2008/0132257 A1   Jun. 5, 2008

Related U.S. Application Data

(60) Provisional application No. 60/868,657, filed on Dec. 5, 2006.

(51) Int. Cl.
G06F 15/173 (2006.01)
(52) U.S. Cl. .......................... 709/224; 709/223; 455/466
(58) Field of Classification Search .................. 709/223, 709/224; 455/466
See application file for complete search history.

(56) References Cited

U.S. PATENT DOCUMENTS

| 6,502,106 | B1 | 12/2002 | Gampper et al. |
| 7,316,031 | B2 * | 1/2008 | Griffith et al. .................. 726/22 |
| 2006/0059167 | A1 | 3/2006 | Burgel et al. |
| 2006/0217115 | A1 * | 9/2006 | Cassett et al. ................. 455/423 |
| 2006/0224730 | A1 * | 10/2006 | Fok et al. ...................... 709/224 |
| 2006/0234639 | A1 * | 10/2006 | Kushwaha et al. ........ 455/67.11 |
| 2008/0049630 | A1 * | 2/2008 | Kozisek et al. ............... 370/250 |

FOREIGN PATENT DOCUMENTS

| EP | 1227639 | 7/2002 |
| JP | 2005057367 A | 3/2005 |
| JP | 2007528541 A | 10/2007 |
| TW | I265689 | 11/2006 |
| TW | I266509 | 11/2006 |
| TW | I267271 | 11/2006 |
| WO | 0219625 | 3/2002 |
| WO | WO2005084030 A1 | 9/2005 |
| WO | 2006116120 | 11/2006 |

OTHER PUBLICATIONS

International Search Report—PCT/US2007/086185, International Search Authority—European Patent Office—Jul. 3, 2008.
Written Opinion—PCT/US2007/086185, International Search Authority—European Patent Office—Jul. 3, 2008.

* cited by examiner

*Primary Examiner* — Mohamed Wasel
(74) *Attorney, Agent, or Firm* — Abdollah Katbab; Darren M. Simon

(57) ABSTRACT

Methods, systems, devices and computer program products are presented for requesting wireless device performance data and providing an optimal file size for the performance data. Present aspects provide for estimating the size of requested performance data, at the time of the request, and assessing other factors, such as requesting party preferences, to determine optimal performance data file size. In this regard, the performance data service provider is able to prepare and make accessible optimally sized performance data files, as the data becomes available as opposed to creating one comprehensive performance data file when all of the requested data is available. Additionally, some present aspects may provide for performance data requesting parties to implement Extensible Markup Language (XML) as the communication tool between the requesting device and the performance data-supplying network entity.

29 Claims, 7 Drawing Sheets

METHODS AND APPARAUS FOR REQUESTING WIRELESS COMMUNICATION DEVICE PERFORMANCE DATA AND PROVIDING THE DATA IN OPTIMAL FILE SIZE

CLAIM OF PRIORITY UNDER 35 U.S.C. §119

The present Application for Patent claims priority to Provisional Application No. 60/868,657 entitled "Method And Apparatus For Determining Optimal File Size For The Download And Process" filed Dec. 5, 2006, and assigned to the assignee hereof and hereby expressly incorporated by reference herein.

BACKGROUND

1. Field

The disclosed aspects relate to wireless communication devices, and more particularly, to systems, methods and apparatus for requesting performance data from wireless communication devices and providing the data to the requesting party in optimal file size.

2. Background

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network The current trend in the wireless communication device industry is to market devices that have a wide range of functionality. For example, a single wireless communication device may be capable of wireless telephone communication, digital photography, wireless Internet communication, electronic mail (email) and/or Short Message Service (SMS) communication, wireless audio and/or video downloading, other wireless network service communications and the like. In addition, the wireless communication device may be capable of storing or wirelessly accessing numerous applications that can then be executed on the wireless communication device.

As the functionality of these devices expands, the device users increasingly demand high performance and reliability. To insure such high performance and reliability, applications are being implemented to monitor performance so that service providers, device manufacturers and the like can respond to problems, or the potential for problems, in a timely fashion. Most of these monitoring-type applications require data to be collected at the wireless device and, in many instances, communicated to a network device for subsequent performance analysis. For example, a wireless telephone may log data related to calls or may capture data when an event, such as a "call failure" or a "call drop" occurs.

Currently, service providers, device manufacturers or any other third party entity that desires to have access to wireless device performance data will request performance data though a network service. For example, a requesting third party entity desiring performance data may access a network site run by the network service to request performance data from one or more wireless devices and provide performance data parameters. The performance data parameters may include, but are not limited to, identity of the wireless device or group of wireless devices from which data is to be collected, the events that are to be logged by the identified wireless device (s); the duration of time for collecting data; the percentage of data requested based on the total amount of data logged and the like. Once the network service has received a request, the network service configures the wireless device(s), retrieves the performance data from the wireless device(s), assembles a performance data file of the requested data for the requesting party and provides the requesting party access to the file.

In many instances the requesting third party will request performance data from numerous wireless devices and for extended periods of time, for example a month or thirty (30) day period. As such, the cumulative data that is collected from the wireless device(s) may form a large data file. For example, such performance data files may be as large as about 10 megabytes to about 1 gigabyte in terms of size. Network communication of such large data files poses a problem in terms of network efficiency and the use of network bandwidth. A large amount of network bandwidth must be available in order to communicate such large data files. In many instances, network communication of such large files may be delayed or otherwise fail due to network bandwidth constraints.

Additionally, in stances in which the requesting third party has requested performance data over an extended period of time, for example, a week, a month or the like, the requesting party may desire access to the performance data before all of the requested data has been generated and logged at the wireless device. For example, if the requesting third party has requested performance data for a month long period, the requesting period may benefit from having access to the data at weekly intervals.

Therefore, a need exists to develop methods, systems, apparatus and computer program products that alleviate problems related to large performance data files and, specifically, problems related to network communication of such large data files. As such, the desired methods, systems, apparatus and computer program products should provide for greater efficiency in terms of network bandwidth utilization. Additionally, a need exists to develop methods, systems, apparatus and computer program products that do not limit the requesting party to accessing the performance data only after the entire requested data has been generated and compiled. As such, the desired methods, systems, apparatus and computer program products should provide the user the ability to access to data while other data is still being generated, collected and compiled into performance data files.

SUMMARY

Present aspects provide for methods, devices, systems and computer program products for requesting wireless device performance data and providing an optimal file size for the performance data. Specifically, present aspects provide for estimating the size of requested performance data, at the time of the request, and assessing other factors, such as requesting party preferences, to determine optimal performance data file size. The optimal file size will typically be less than the size of the requested performance data. As such, multiple files of optimal size can be created with each file including a portion of the requested performance data. In this regard, the performance data service provider is able to prepare and make accessible optimally sized performance data files, as the data becomes available as opposed to creating one comprehensive performance data file when all of the requested data is available. By making optimally sized performance data files accessible to the requesting party as the data becomes available, the requesting party is able to process and use the data at any earlier point in time. In addition, smaller optimally sized performance data files provide more efficiency in the communication network in terms of the bandwidth necessary for communication to occur.

Additionally, some present aspects may provide for performance data requesting parties and/or the network device, such as a user manager, to implement Extensible Markup Language (XML) protocol as the communication tool between the requesting device and the performance data-supplying network entity. In this regard, XML provides the requesting party the ability to make performance data requests, configure the collection of performance data on wireless devices, receive access to optimally sized performance data files and make other performance data-related communications with the performance data supplier. By implementing XML as the communication interface, the performance data supplier is able to offer the requesting party a messaging mechanism that allows for reaching out and controlling the collection of performance data at the wireless devices via interface with the network device, such as a user manager server or the like.

In one aspect, a method is described for providing wireless communication device performance data of optimal file size. The method includes receiving a request for performance data monitored by one or more wireless communication devices, determining an optimal file size for segments of the requested performance data by estimating the overall size of the requested performance data based on a time span for the requested performance data, generating files of optimal size as segments of the requested performance data become available, storing the generated files in memory and providing a requester access to each generated file as the files become available. In some aspects, determining the optimal file size may additionally provide for determining a readjusted optimal file size, during the performance data collection process, based on network characteristics, such as network bandwidth. Additionally, determining the optimal file size may include determining a requester preference related optimal file size, for example, the requester may limit the file size or define a desired time period between accesses to generated files. In other aspects, determining an optimal file size further comprises determining available network bandwidth.

In some aspects of the method receiving the request for performance data monitored by one or more wireless communication devices includes receiving an Extensible Markup Language (XML) protocol formatted request for performance data. Additionally, in such aspects providing a requester access to each generated file as the files become available may include providing an XML formatted response to the requester that provides for access to each of the generated files as the files become available. In addition, receiving the request for performance data monitored by one or more wireless communication devices may additionally include receiving one or more requester preferences for determining optimal file size and/or receiving performance data configuration for the one or more wireless communication devices.

In some aspects of the method, providing the requester access to each generated file as the files become available involves providing a requester the URL corresponding to a generated file for accessing the generated file as the file becomes available while in other aspects providing the requester access may involve communicating each generated file to the requester as the files become available.

Another related aspect is provided for by at least one processor. The processor is configured for a first module for receiving a request for performance data monitored by one or more wireless communication devices, a second module for determining an optimal file size for segments of the requested performance data by estimating the overall size of the requested performance data based on a time span for the requested performance data, a third module for generating files of optimal size as segments of the requested performance data become available, a fourth module for storing the generated files in memory and a fifth module for providing a requester access to each generated file as the files become available.

A further related aspect is provided for by a computer program product. The computer program product includes a computer-readable medium having a first set of codes for causing a computer to receive a request for performance data monitored by one or more wireless communication devices, a second set of codes for causing a computer to determine an optimal file size for segments of the requested performance data by estimating the overall size of the requested performance data based on a time span for the requested performance data, a third set of codes for causing a computer to generate files of optimal size as segments of the requested performance data become available, a fourth set of codes for storing the generated files in memory and a fifth set of codes for causing the computer to provide a requester access to each generated file as the files become available.

Yet another related aspect is defined by a wireless communication device. The device includes means for receiving a request for performance data monitored by one or more wireless communication devices, means for determining an optimal file size for segments of the requested performance data by estimating the overall size of the requested performance data based on a time span for the requested performance data, means for generating files of optimal size as segments of the requested performance data become available, means for storing the generated files in memory and means for providing a requester access to each generated file as the files become available.

Additionally, another aspect is provided for by a network device. The network device includes a computer platform including a processor and a memory and a communications module in communication with the processor and operable to receive a request for performance data monitored by one or more wireless communication devices. The network device also includes an optimal file size determiner module stored in the memory, executable by the processor and operable to determine an optimal file size for segments of the requested performance data by estimating the overall size of the requested performance data based on a time span of the requested performance data, a file generator module stored in the memory, executable by the processor and operable to generate files of optimal size as segments of the requested performance data become available and a file access logic stored in the memory, executable by the processor and operable to provide a requester access to each generated file as the file becomes available.

In some aspects of the network device the optimal file size determiner module may be further operable to readjust the optimal file size based on network characteristics, such as network bandwidth. In this regard, the optimal file size may dynamically change during the performance data collection period as dictated by network characteristics or any other factor influencing file size. Additionally, the optimal file size determiner module may be further operable to determine an optimal file size for segments of the requested performance data based on a requester preference, such as a file size preference and/or a time between accesses to generated files. Additionally, the optimal file size determiner module may be further operable to determine an optimal file size for segments of the requested performance data based on available network bandwidth.

According to another aspect, a method for requesting and accessing performance data monitored by one or more wireless communication devices is defined. The method includes generating an Extensible Markup Language (XML) formatted request for performance data monitored by one or more wireless communication devices, communicating the request to a network device and receiving an XML formatted response that provides access to performance data files that include segments of the requested performance data as the files become available. Additionally, in some aspects generating an XML formatted request may include generating an XML formatted request that includes an XML-based command identifier corresponding to at least one of "Get Mobile List", "FILE Generation", "Register Mobiles", "Unregister Mobiles" and "Command Mobiles". Also, in some aspects, generating an XML formatted request may include a requester preference for performance data files, such as file size and/or time between access to generated files, performance data configuration for the one or more wireless communication devices. In some aspects, receiving an XML response that provides access to performance data files further comprises receiving an XML response that includes a Uniform Resource Locator (URL) associated with a performance data file for accessing the performance data file as the file becomes available and or receiving a communication including the performance data file as the file becomes available.

A related aspect is provided for by at least one processor, the processor is configured for a first module for generating an Extensible Markup Language (XML) formatted request for performance data monitored by one or more wireless communication devices, a second module for communicating the request to a network device and a third module for receiving an XML formatted response that provides access to performance data files that include segments of the requested performance data as the files become available.

Another related aspect is defined by a computer program product. The computer program product includes a computer-readable medium having a first set of codes for causing a computer to generate an Extensible Markup Language (XML) formatted request for performance data monitored by one or more wireless communication devices, a second set of codes for causing a computer to communicating the request to a network device and a third set of codes for causing a computer to receive receiving an XML formatted response that provides access to performance data files that include segments of the requested performance data as the files become available.

According to another related aspect, a wireless communication device is defined. The wireless communication device includes means for generating an Extensible Markup Language (XML) formatted request for performance data monitored by one or more wireless communication devices, means for communicating the request to a network device and means for receiving an XML formatted response that provides access to performance data files that include segments of the requested performance data as the files become available.

A further aspect is defined by a communication device that includes a computer platform including a processor and a memory, an Extensible Markup Language (XML) module stored in the memory, in communication with the processor and operable to generate an XML formatted request for performance data monitored by one or more wireless communication devices and a communications module stored in the memory, in communication with the processor and operable to communicate the XML formatted request to a network device and receive XML responses from the network device and a network access module stored in the memory, in communications with the processor and operable to provide access to performance data files that include segments of the requested performance data as the files become available. In some aspects, the XML module is further operable to generate the XML formatted request that includes a requester preference for performance data files, such as the file size and time between access to generated files, and/or performance data configuration for the one or more wireless communication devices. In other aspects, the network access module is further operable to access a Uniform Resource Locator (URL) associated with a performance data file as the file becomes available.

Thus, present aspects provide for methods, systems, devices and computer program products that request wireless device performance data and provide an optimal file size for the performance data. Specifically, present aspects provide for estimating the size of requested performance data, at the time of the request, and assessing other factors, such as requesting party preferences, to determine optimal performance data file size. Typically, multiple files of optimal size are created with each file including a portion of the requested performance data. In this regard, the performance data service provider is able to prepare and make accessible optimally sized performance data files, as the data becomes available as opposed to creating one comprehensive performance data file when all of the requested data is available. By making optimally sized performance data files accessible to the requesting party as the data becomes available, the requesting party is able to process and use the data at any earlier point in time. In addition, smaller optimally sized performance data files provide more efficiency in the communication network in terms of bandwidth utilization.

Additionally, some present aspects may provide for performance data requesting parties to implement Extensible Markup Language (XML) as the communication tool between the requesting device and the performance data-supplying network entity. By implementing XML as the communication interface, the performance data supplier is able to offer the requesting party a messaging mechanism that allows for reaching out and controlling the collection of performance data at the wireless devices via interfacing with the network device, such as a user manager server or the like.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

The present devices, apparatus, methods, computer-readable media and processors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The various aspects are described herein are in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Figure 1:
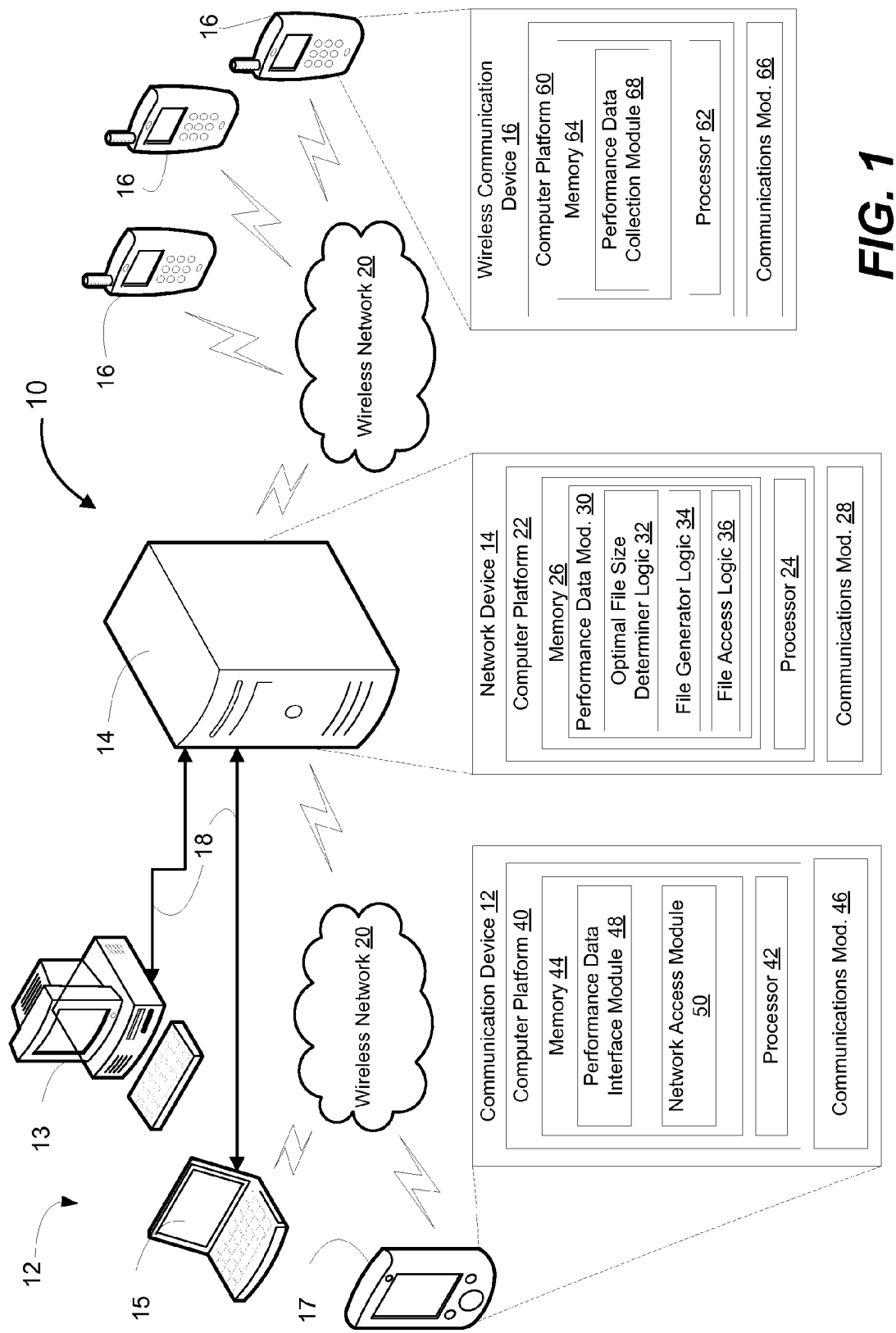
FIG. 1 is a block diagram of a system for requesting performance data from wireless communication device and providing the data to the requesting party in optimal file size, according to an aspect.

Referring to FIG. 1, a block diagram is depicted of a system for requesting performance data from wireless communication device and providing the data to the requesting party in optimal file size, according to an aspect. FIG. 1 is a block diagram of a system for requesting performance data from wireless communication device and providing the data to the requesting party in optimal file size, according to an aspect. The system 10 includes computing devices 12, such as personal computer (PC) 13, laptop computer 15 and wireless device 17; network device 14, such as a user manager server; and wireless devices 16. The computing devices 12 are operable to generate and communicate performance data requests to the network device 14. Performance data requests may be communicated across a conventional wired network 18 or a wireless network 20 depending on the functionality of computing device 12. For example, PC 13 typically communicates a performance data request across wired network 18, wireless device 17 typically communicates requests across wireless network 20 and laptop computer 15 may communicate the requests across either the wired 18 or wireless network 20. The network device 14 is operable to receive the requests, determine optimal file sizes for the requested performance data, receive performance data from wireless devices 16, generate performance data files of optimal size, store the generated performance data files and make the files accessible to the requesting party.

Performance data may include, but is not limited to, any wireless device-based or network interaction based data. For example, performance data may include any one-time only event or re-occurring events that occur at wireless device 16, data related to some component on wireless device 16, and data related to the state of a component on wireless devices 16. Examples of events occurring at wireless device 16 include, but are not limited to, a call drop, a call success, an access failure, and access success. Examples of network interaction data include, but are not limited to, RF characteristics, GPS characteristics and the like.

Network device 14 includes a computing platform 22 having a processor 24 and a memory 26. Additionally, network device 14 includes communications module 28 operable for receiving performance data requests from computing devices 12 and receiving performance data from wireless devices 16. Memory 26 includes performance data module 30. Performance data module 30 includes a series of applications operable for receiving performance data requests from third parties, such as network providers, service providers, device manufacturers and the like, upload performance data from wireless communication devices and generate performance data reports/files according to the requesting party requirements. For example, see the MobileView™ service available from Qualcomm Incorporated of San Diego, Calif.

The performance data module 30 includes optimal file size determiner logic 32 operable to determine the optimal file size for requested performance data based on one or more file size factors, such as the estimated size of the cumulative requested performance data, user preferences and network bandwidth. The estimated size of the cumulative requested performance data may be determined based on the defined performance data that is to be collected, the defined time period for accumulating performance data, collected performance data history and the like. The performance data module 30 additionally includes file generator logic 34 operable to generate performance data files according to the determined optimal file size and file access logic 36 operable to provide the requesting party with access to the generated performance data files. In one embodiment, the file access logic 36 may be operable to store the generated performance data files in network memory (not shown in FIG. 1) and provide the requesting party with a Universal Resource Locator (URL) to access the generated performance data files as they become available. In alternate embodiments, the file access logic 36 may be operable to directly communicate the generated performance data files to the requesting party via the communications module 28.

Computing device 12 includes a computing platform 40 having a processor 42 and a memory 44. Additionally, computing device 12 includes communications module 46 operable for communicating performance data requests from computing devices 12 and receiving access to performance data files from network device 14. Memory 44 may include a performance data interface module 48 operable for generating a performance data request that may include performance data file size parameters, performance data collection configuration and the like. The performance data interface module 48 may, for example, rely on XML protocols or any other computing protocols that are sufficient to communicate commands to the network device 14. Optionally, performance data requests may be generated by other means, such as a computing device interface with an associated network entity, such as a network web site or the like. Additionally, the memory 44 of computing device 12 may include a network access module 50 operable for accessing and downloading network stored performance data files as they become available.

Wireless devices 16 include a computing platform 60 having a processor 62 and a memory 64. Additionally, wireless devices 16 include communications module 66 operable for communicating collected performance data to the network device 14. Memory 64 may include an performance data collection module 68 operable for collecting performance data, such as call event data, for example, call drop, call failure, call success, service outages and the like, from the wireless device 16. Once collected the wireless device may upload the collected data to the network device 14 based on a predetermined upload schedule.

Figure 2:
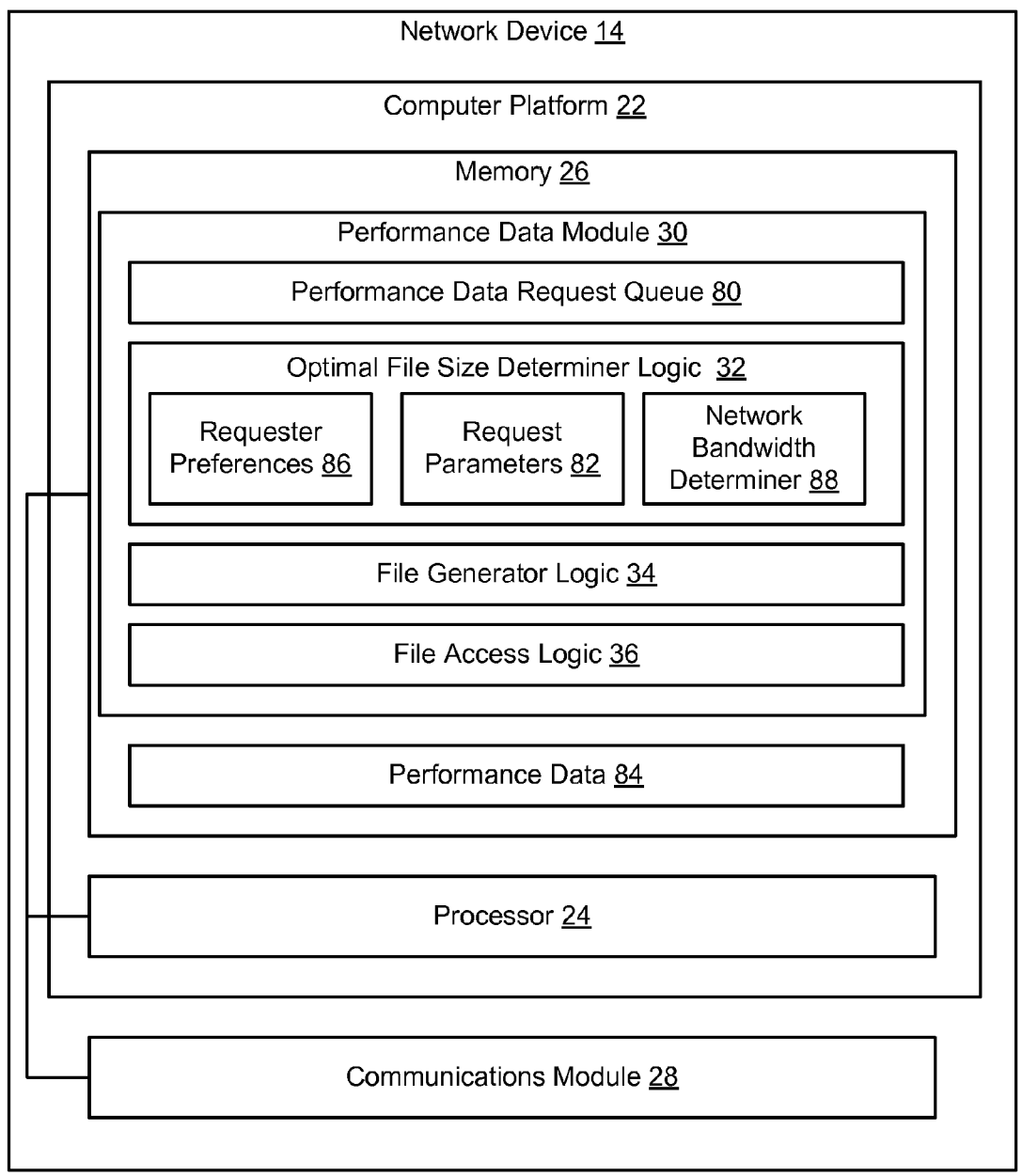
FIG. 2 is a block diagram of a network device operable to receive performance data requests and determine optimal performance data file size, according to an aspect.

FIG. 2 is a block diagram of a network device 14 operable to receive performance data requests, determine optimal performance data file size, receive performance data from wireless communication device, generate performance data files of optimal size and make the files accessible to the requesting party. Network device 14 may comprise at least one of any type of network device, such as a server, personal computer, mini computer, mainframe computer, or any computing device either special purpose or general computing device having a computer platform 22, a processor 24, and a memory 26. Alternatively, the network device 14 may comprise more than one network device. Further, the modules, applications and logic described herein as being operated on or executed by the network device 14 may be executed entirely on a single network device or alternatively, in other aspects, separate servers or computer devices may work in concert to provide data in usable formats to parties, and/or to provide a separate layer of control in the data flow between the wireless device clients and the modules and applications executed by network device 14.

The network device 14 may include computer platform 22 operable to transmit and receive data across wired 18 or wireless network 20, and that can execute routines and applications. Computer platform 22 may include a memory 26, which may comprise volatile and nonvolatile memory such as read-only and/or random-access memory (RAM and ROM), EPROM, EEPROM, flash cards, or any memory common to computer platforms. Further, memory 26 may include one or more flash memory cells, or may be any secondary or tertiary storage device, such as magnetic media, optical media, tape, or soft or hard disk. Further, computer platform 22 also may include a processor 24, which may be an application-specific integrated circuit (ASIC), or other chipset, processor, logic circuit, or other data processing device.

The network device 14 may further include a communications module 28 embodied in hardware, firmware, software, and combinations thereof, that enables communications among the various components of the network device 14, as well as between the network device 14 and a computing device 12 and wireless communication device 16. In this regard, in some aspects, communications module 28 may serve as the delivery mechanism that is operable for communicating performance data requests and the receipt mechanism for receiving access to performance data files. The communication module may include the requisite hardware, firmware, software and/or combinations thereof for establishing a wired and/or wireless communication connection.

The memory 26 of network device 14 includes performance data module 30 operable to receive performance data requests, determine optimal performance data file size, receive performance data from wireless communication device, generate performance data files of optimal size and make the files accessible to the requesting party. The performance data module 30 may include a performance data request queue 80 operable to hold performance data requests as a sequence of requests awaiting processing. The queue may be required as performance data requests are typically handled in batch mode.

The performance data module 30 includes optimal file size determiner logic 32 operable to determine the optimal file size for requested performance data based on one or more file size factors, such as the estimated size of the cumulative requested performance data, user preferences and network characteristics, such as network bandwidth. In this regard, optimal file size determiner logic 32 may rely of performance data parameters 82, such as the definition of the performance data to be collected and/or the defined time period for accumulating performance data and any other requester defined performance data parameters to estimate the size of the cumulative requested performance data or any remaining portion of the requested performance data. In addition, optimal file size determiner logic may rely on stored performance data 84 to assess the size of historical performance data files having similar performance data parameters as the current request. In some aspects, user preferences 86, which may define a file size or the frequency for which files are required by the requesting party (for example, hourly performance files, daily performance files, weekly performance files and the like) may override the determination based on estimated cumulative file size and, thus, may dictate the size and/or frequency of performance data files. Additionally, optimal file size determiner logic 32 may include a network bandwidth determiner 88 operable to determine the available network bandwidth that is available prior to making a file accessible. If the available bandwidth does not support the optimally determined performance data file size, the file size may be further diminished to accommodate the available bandwidth. In this regard, the optimal file size determiner logic 32 may be executed each time a requesting party requests access to a performance data file to determine if current network characteristics, such as network bandwidth, or any other factors influencing file size warrant readjusting the optimal file size. The network bandwidth of concern may be associated with the request to access a performance data file or it may be associated with the IP address of the requester.

The optimal file size determiner logic 32 may be employed prior to queuing the request in the performance data request queue 80 or, in other aspects, the optimal file size determiner logic may be employed after the performance data request has been temporarily stored in the queue or after a requester has requested access to a performance data file The performance data module 30 may additionally include file generator logic 34 operable to generate performance data files according to user preferences, determined optimal file size and/or network characteristics, such as network bandwidth and the like. Performance data is typically uploaded from wireless device 16 in a raw data format and will require post-processing at the network device in order to format and compile the data into performance data files. In addition, post-processing may be required to meet the specific requirements of the requesting party in terms of the configuration of the data requested. Thus, extraneous information in the raw data format is typically parsed from the data stream prior to generating the performance data files.

Additionally, the performance data module 30 may include file access logic 36 operable to provide the requesting party with access to the generated performance data files. In one embodiment, the file access logic 36 may be operable to store the generated performance data files in network memory (not shown in FIG. 1) and provide the requesting party with a Universal Resource Locator (URL) to access the generated performance data files as they become available. In alternate embodiments, the file access logic 36 may be operable to directly communicate the generated performance data files to the requesting party via the communications module 28. As such the performance data module 30 of the present aspects is able to provide the requester with access to portions of the cumulative performance data prior to the end of the defined time period for collecting the data. As previously noted the optimal file size determiner logic 32 may be executed in accordance with the file access logic 36, such that providing access to a performance data file may warrant reassessing network characteristics or other factors influencing file size to determine if readjusting the optimal size of the performance data file is needed. In this regard, optimal file may be dynamically adjusted during the period in which performance data is being collected logged and communicated to the network device 14.

Figure 3:
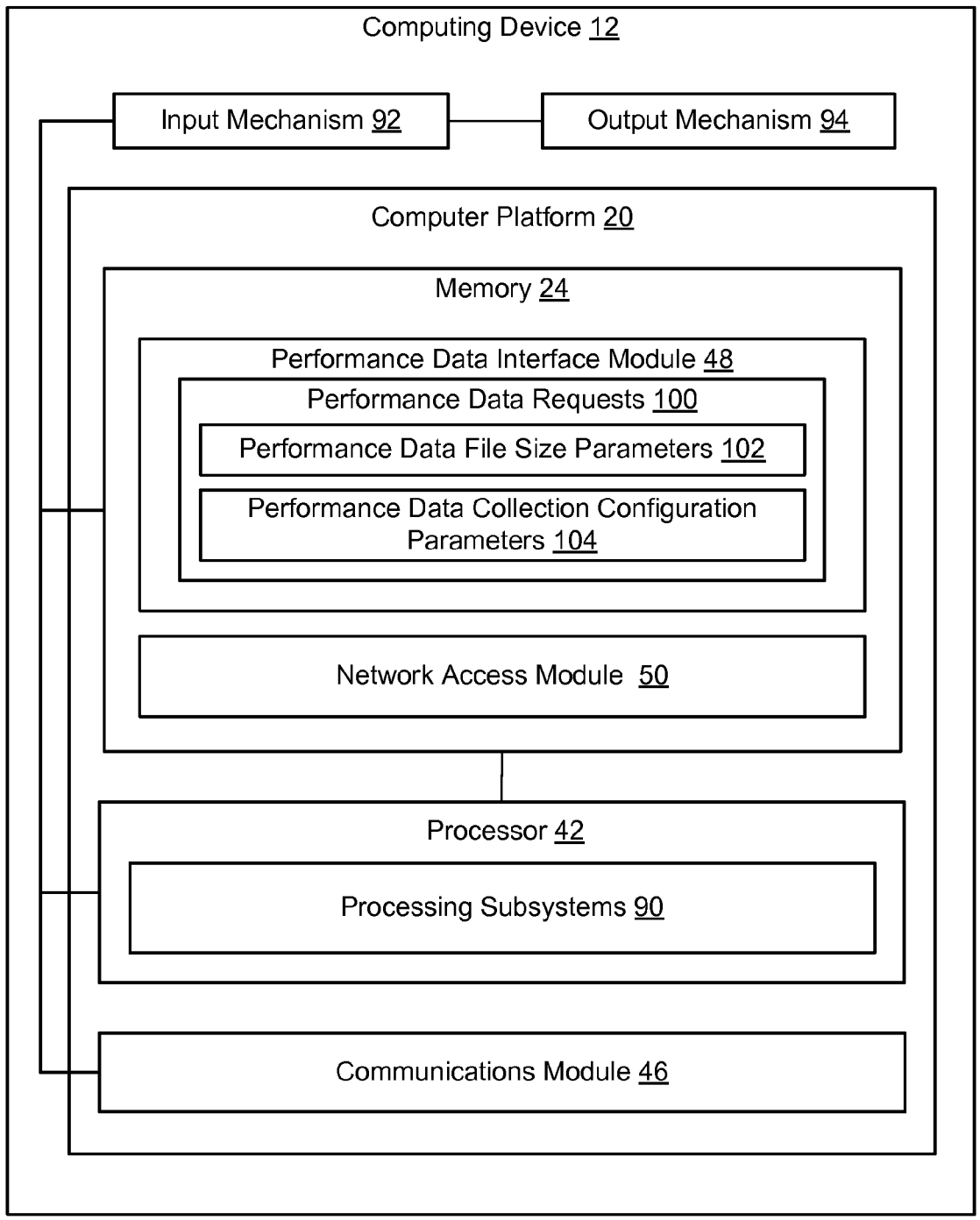
FIG. 3 is a block diagram of a computing device according to another aspect.

Referring to FIG. 3, according to another aspect, a detailed block diagram of a computing device 12 operable to generate performance data requests and, in response to the requests, receive a response that provides access to optimally sized performance data files. The computing device 10 may include any type of computerized, communication device, such as personal computer (PC), cellular telephone, Personal Digital Assistant (PDA), two-way text pager, portable computer, and even a separate computer platform that has a wireless communications portal, and/or may have a wired connection to a network or the Internet. The wired or wireless computing device can be a remote-slave, or other device that does not have an end-user thereof but simply communicates data across a wired or wireless network, such as remote sensors, diagnostic tools, data relays, and the like. The present computing apparatus and associated methods can accordingly be performed on any form of wired or wireless computing device or wireless computer module, including a wireless communication portal, including without limitation, wireless modems, PCMCIA cards, access terminals, desktop computers or any combination or sub-combination thereof.

The computing device 12 includes computer platform 40 that can transmit data across a wireless and/or wired network, and that can receive and execute routines and applications. Computer platform 40 includes memory 44, which may comprise volatile and nonvolatile memory such as read-only and/or random-access memory (RAM and ROM), EPROM, EEPROM, flash cards, or any memory common to computer platforms. Further, memory 44 may include one or more flash memory cells, or may be any secondary or tertiary storage device, such as magnetic media, optical media, tape, or soft or hard disk.

Further, computer platform 40 also includes processor 42, which may be an application-specific integrated circuit (ASIC), or other chipset, processor, logic circuit, or other data processing device. Processor 42 may includes various processing subsystems 90 embodied in hardware, firmware, software, and combinations thereof, that enable the functionality of communication device 10 and the operability of the communication device on a wireless network. For example, processing subsystems 42 allow for initiating and maintaining communications, and exchanging data, with other networked devices. In aspects in which the computing device is a wireless communication device, such as a cellular telephone the communications processor 42 may additionally include one or a combination of processing subsystems 90, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 3 for the sake of clarity). For the disclosed aspects, processing subsystems 90 of processor 42 may include any subsystem components that interact with the performance data interface module 48 and/or network access module 50.

Computer platform 40 additionally includes communications module 46 embodied in hardware, firmware, software, and combinations thereof, which enables communications among the various components of the computing device 12, as well as between the computing device 12 wireless network 16 and or wired network 18. In described aspects, the communication module 46 enables the communication of all correspondence between wireless communication device 10 and network device 14. Thus, communication module 46 may include the requisite hardware, firmware, software and/or combinations thereof for establishing a wireless and/or wired network communication connection and for receiving satellite signals. In some aspects, the communication module is operable to communicate performance data requests and receive communications that provide access to the performance data files.

The memory 44 of computer platform 40 may include a performance data interface module 48 operable for generating a performance data request 100 that may include performance data file size parameters 102, performance data collection configuration 104 and the like. In one aspect, performance data interface module 48 may implement eXtensible Markup Language (XML) protocol to facilitate performance data file requests to the network device 14. Alternatively, other communication protocols may be used to command the network device and request performance data files. Alternatively, the performance data file size parameters 102, performance data collection configuration 104 and the like may be communicated in separate communications. By providing for performance data requests, present aspects allow the third party requester to control the data collection related actions of the network device 14 without having to interface with a user interface (UI), such as web-based UI. Examples of XML formatted performance data requests are included in subsequent discussion. Optionally, performance data requests may be generated by other means, such as computing device interface with an associated network entity, such as a network web site or the like.

Additionally, the memory 44 of computing device 12 may include a network access module 50 operable for accessing and downloading network stored performance data files as they become available. In certain aspects, as discussed in relation network device 14, the network device will generate performance data files of optimal size as the data becomes available and will store the data with an associated URL for appropriate requesting party access purposes. For example, the network access module 50 may be an Internet browser application that provides access to a web site associated with the URL storage of the performance data files. Operation of network access module 50 to access and download a performance data file may trigger execution of the optimal file size determiner logic 32 at the network device 14. As previously noted, the optimal file size determiner logic 32 may be executed to reassess network characteristics and the like to determine if readjusting of the optimal size of the performance data file is needed.

Additionally, computing device 12 has input mechanism 92 for generating inputs into communication device, and output mechanism 94 for generating information for consumption by the user of the communication device. For example, input mechanism 92 may include a mechanism such as a key or keyboard, a mouse, a touch-screen display, a microphone, etc. In certain aspects, the input mechanisms 92 provides for user input to interface with a module, such as performance data interface module 48 to initiate a performance date request. Further, for example, output mechanism 94 may include a display, an audio speaker, a haptic feedback mechanism, etc. In the illustrated aspects, the output mechanism 94 may include a display operable to display an application interface for requesting performance data.

Figure 4:
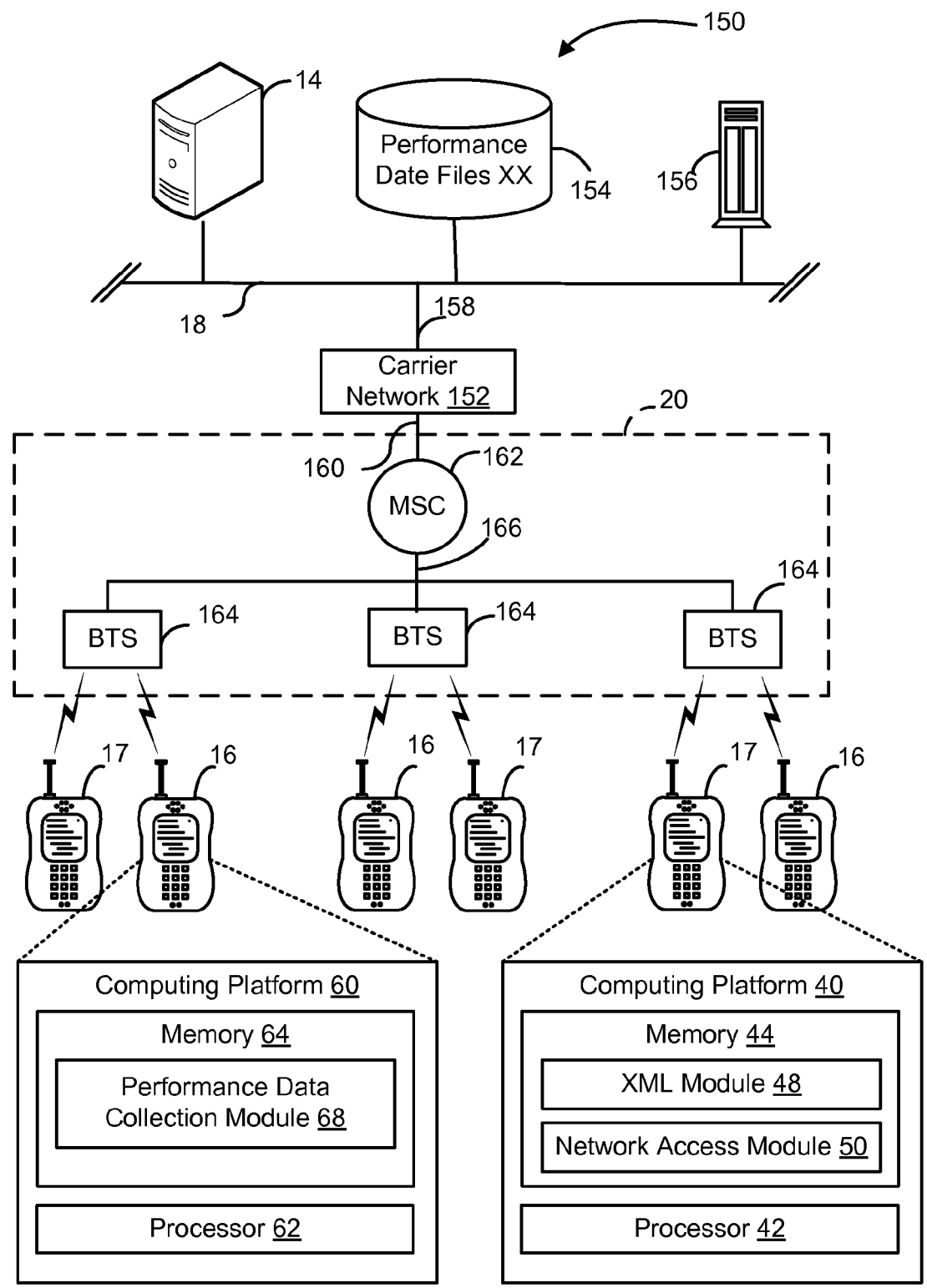
FIG. 4 is block diagram of a cellular communications network, according to an aspect.

FIG. 4 represents a block diagram of a cellular network. Wireless network 20 may comprise a cellular network and, as such may be implemented to communicate performance data requests 100 to the network device 14, upload performance data from wireless devices 16 to the network device 14 and provide access to optimally sized performance data files as the become available. Referring to FIG. 4, in one aspect, computing device 12, such as wireless device 17 and wireless device 16 comprise a wireless communication device, such as a cellular telephone. In present aspects, wireless communication devices are configured to communicate via the cellular network 150. The cellular network 150 provides wireless communication devices 17 and 16 the capability to communicate performance data requests 100 to the network device 14 and download performance data to the network device 14, respectively. The cellular telephone network 150 may include wireless network 20 connected to a wired network 18 via a carrier network 152. FIG. 4 is a representative diagram that more fully illustrates the components of a wireless communication network and the interrelation of the elements of one aspect of the present system. Cellular telephone network 150 is merely exemplary and can include any system whereby remote modules, such as wireless communication devices 17 and 16 communicate over-the-air between and among each other and/or between and among components of a wireless network 20, including, without limitation, wireless network carriers and/or servers.

In network 150, network device 14, such as a user manager server, can be in communication over a wired network 18 (e.g. a local area network, LAN) with a separate network database 154 for storing the performance data files XX. Further, a data management server 156 may be in communication with network device 14 to provide post-processing capabilities, data flow control, etc. Network device 14, network database 154 and data management server 156 may be present on the cellular telephone network 150 with any other network components that are needed to provide cellular telecommunication services. Network device 14, and/or data management server 156 communicate with carrier network 152 through a data links 158 and 160, which may be data links such as the Internet, a secure LAN, WAN, or other network. Carrier network 152 controls messages (generally being data packets) sent to a mobile switching center (MSC) 162. Further, carrier network 152 communicates with MSC 162 by a network 160, such as the Internet, and/or POTS (plain old telephone service). Typically, in network 160, a network or Internet portion transfers data, and the POTS portion transfers voice information. MSC 162 may be connected to multiple base stations (BTS) 164 by another network 166, such as a data network and/or Internet portion for data transfer and a POTS portion for voice information. BTS 118 ultimately broadcasts messages wirelessly to the wireless communication devices 17 and 16, by short messaging service (SMS), or other over-the-air methods.

Figure 5:
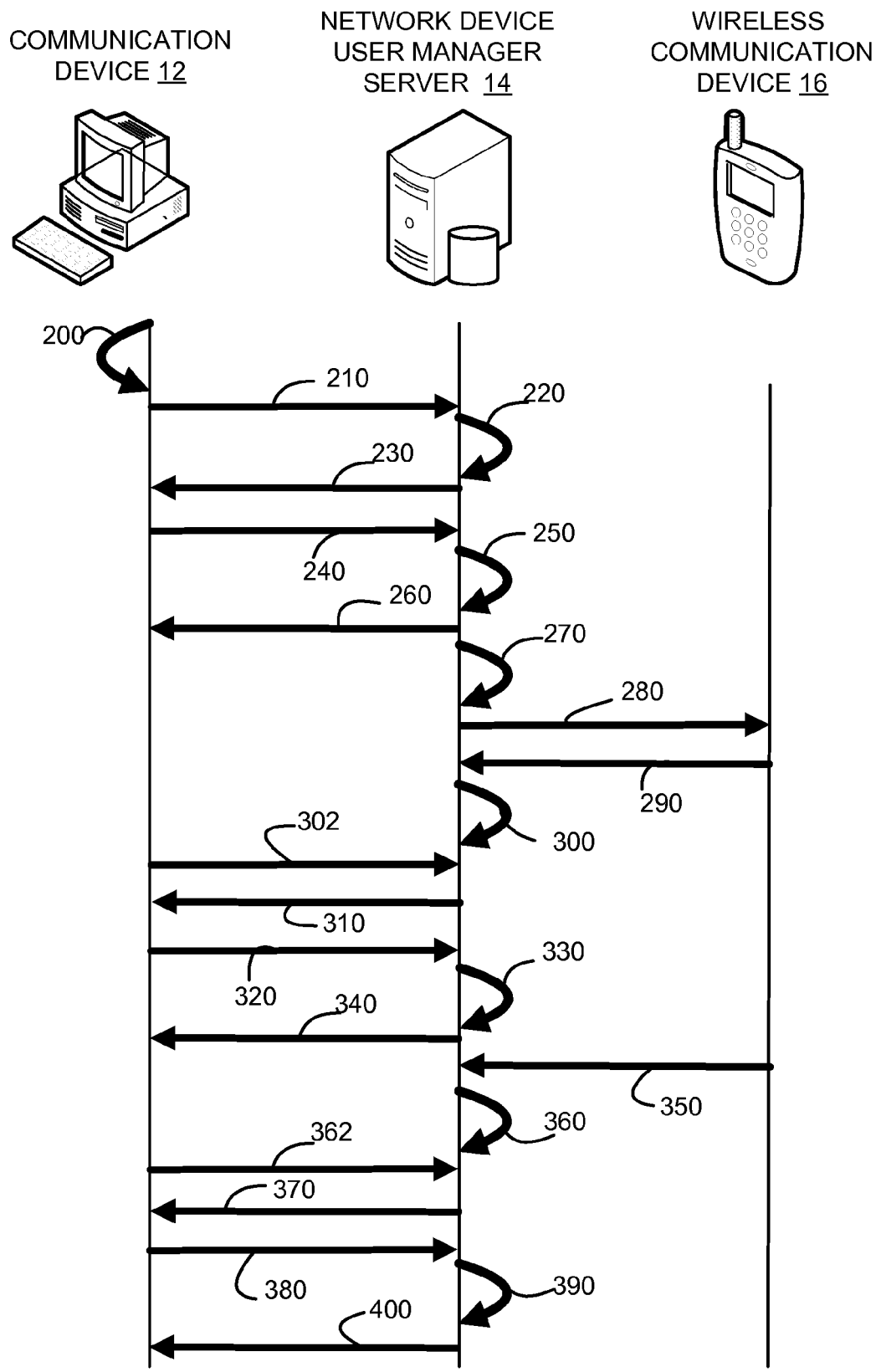
FIG. 5 is a message flow diagram representing performance data requests, optimal file size determination, generation of optimally sized performance data files and providing access to the optimally sized performance data files, according to an aspect.

Referring to FIG. 5, a message flow diagram is depicted illustrating the communication between a requesting party communication device and the network device that receives the request, determines optimal file size, generates the optimally sized performance data files and provides access to the performance data files. At Event 200, a third party requester, such as a service provider, a device manufacturer or the like generates, at a computing device (12) a performance data request (100) and, at Event 210, the performance data request is communicated to a network device (14), such as a user manager server.

At Event 220, the network device validates the performance data request and queues the request for subsequent batch processing. At Event 230, the network device communicates a response back to the third party requester informing that the request has been received, validated and placed in the queue for processing. Additionally, the response may include a token that allows the third party requester to track the progress of the performance data request.

At Event 240, the third party requester sends a status request that includes the token to check on the progress of the performance data request. At Event 250, the network device validates the status request, determines the progress of the performance data request and generates a response. In this instance, by way of example, the performance data request is still in the queue awaiting processing and, therefore the response back to the requester indicates such. At Event 260, the network communicates the status response to the requesting party informing the requester that the performance data request is still in the queue awaiting processing.

At Event 270, the performance data request exits the queue and a determination is made as the optimal size of the performance data files. As previously noted determine the optimal file size determination may be based on one or more file size factors, such as the estimated size of the cumulative requested performance data, requester preferences and network bandwidth. The estimated size of the cumulative requested performance data may be determined based on the defined performance data that is to be collected, the defined time period for accumulating performance data, collected performance data history and the like. Performance data collection parameters and/or requester preferences, such as the desired size or desired frequency, may be communicated with the performance data request or they may be communicated in a separate communication.

At Event 280, the network device will send performance data configuration requests to the wireless devices (16), which define the parameters for data collection, such as which events to capture, the percentage or frequency of events to capture, upload times for performance data and the like. At Event 290, the wireless device (16) uploads the requested performance data to the network device. At Event 300, the network device processes the raw performance data and generates a performance data file according to the requester preferences and the determined optimal file size requirements. Once the file has been generated, a URL is assigned to the file and the file is communicated to network storage for subsequent retrieval by the requesting party.

At Event 302, the requesting device sends a performance data file request to the network device. In alternate aspects, the request for the performance data file may not be required in order to obtain the performance data access response. In such alternate aspects, the performance data files may be made available to the requesting party without the need to send a performance data file request. At Event 310, the network device sends a performance data access response that provides the requester with one or more URLs. Each URL corresponds to a performance data file. The number of performance data files and, thus, the number of URLs are defined by the outcome of the optimal file size determination.

The individual URLs will be activated, thus allowing the requesting party to access the performance data files, as the performance data files are generated and stored. At Event 320, the requesting party activates the URL to request the download of the performance data file. At Event 330, the network device receives the request, retrieves the performance data associated with the URL, and, at Event 340, forwards the performance data file to the requesting party.

At Event 350, the wireless device (16) uploads additional requested performance data to the network device. At Event 360, the network device processes the raw performance data and generates another performance data file according to the requester preferences and the determined optimal file size requirements. Once the file has been generated, the URL is activated and the file is communicated to network storage for subsequent retrieval by the requesting party.

At Event 362, the requesting device sends a performance data file request to the network device. In optional aspects, the request for the performance data file may be not be required in order to obtain the performance data access response. At Event 370, the network device sends a performance data access response that informs the requester that an additional URL is active; i.e., an additional performance data file had been generated and is available for access. At Event 380 the requesting party activates the URL to request the download of the performance data file. At Event 390, the network device receives the request, retrieves the performance data associated with the URL and, at Event 400, uploads the performance data file to the requesting party. This process may continue until all the optimally sized performance data files have been generated and the requesting party has been granted access to the files.

Figure 6:
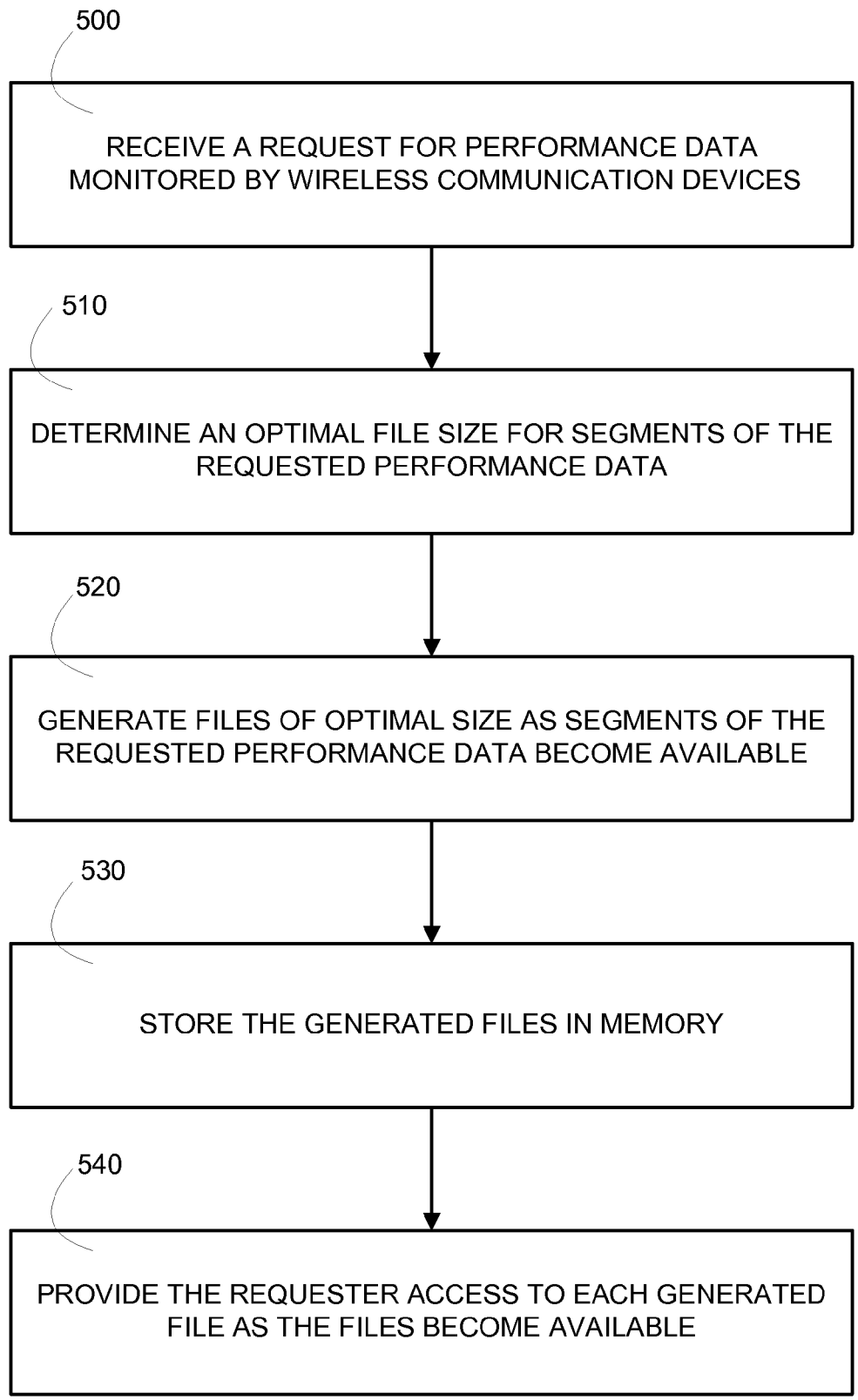
FIG. 6 is a flow diagram of a method for receiving performance data requests and determining optimal file sizes for the performance data, according to an aspect.

FIG. 6 is a flow diagram of a method for receiving performance data requests and determining optimal file size, according to an aspect. At Event 500, a network device receives a request for performance data that is monitored and collected by one or more wireless communication devices. In addition to the request for data, the request may define data collection parameters or performance data file size parameters, such as the desired size of files or the desired frequency at which files should be available for access. At Event 510, the optimal file size for segments of the requested performance data is determined. As previously noted, optimal file size may be determined based on various performance file size factors. For example, in one aspect, requesting party preferences may determine the optimal file size. For example, requesting party defined file size or requesting party defined frequency at which files should be accessible may define the optimal file size. In other aspects, determining the optimal file size may involve estimating the size of the cumulative performance data file based on the defined data to be collected and the defined duration of the collection period. In addition, historical performance data file information may be relied upon to estimate the size of the cumulative performance data file. Once an estimate of the cumulative performance data files has been made, optimal file size for segments of the data can be determined based on requesting party preferences, network bandwidth availability and the like.

At Event 520, the network device generates files of optimal size as segments of the requested performance data become available. In this regard, data is uploaded from the wireless devices to the network devices on a predetermined schedule and files will be generated once an amount of data has been acquired that is equivalent to the optimally determined file size. At Event 530, the generated file is stored in memory. In one aspect, the generated file is associated with an assigned Uniform Resource Locator (URL) and stored in network memory. At Event 540, the requesting party is provided access to each generated file as they become available. In one aspect, the requesting party is provided the associated URL of the generated file and the requesting party is granted access to the files as the URLs become active (i.e., as the files are generated and stored). In another aspect, the generated files may be communicated to the requesting party as they become available.

Figure 7:
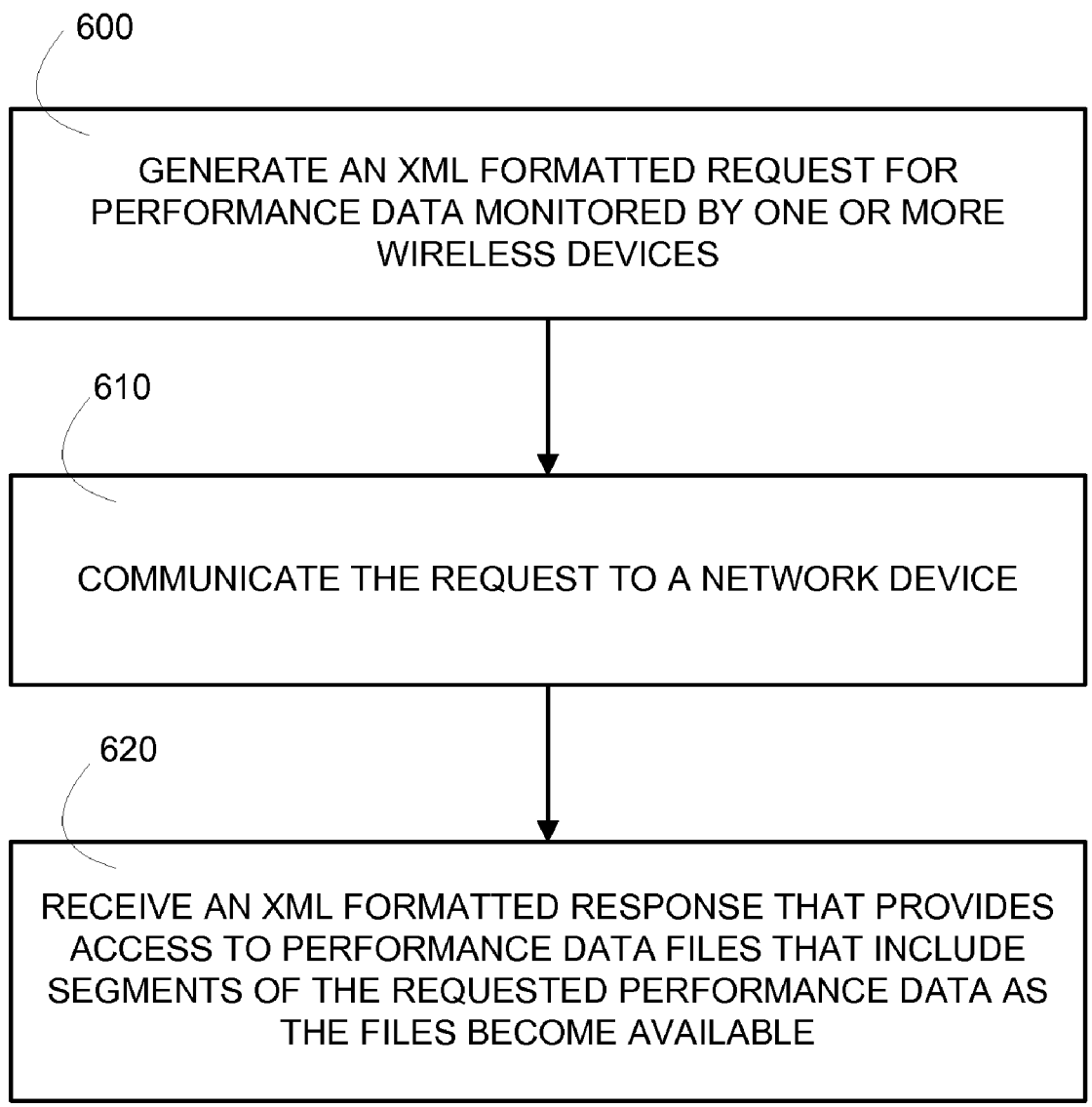
FIG. 7 is a flow diagram of a method for generating performance data requests and, in response, receiving access to optimally sized performance data files, according to an aspect.

FIG. 7 is a flow diagram of a method for requesting performance data and accessing performance data files, according to an aspect. At Event 600, a requesting party generates a request for performance data that is monitored and collected by one or more wireless communication devices. As previously noted, in addition to the request for data, the request may define data collection parameters or performance data file size parameters, such as the desired size of files or the desired frequency at which files should be available for access. Alternately, the data collection parameters and/or performance data file size parameters may be defined in ancillary communications.

At Event 610, the generated performance data request is communicated to the network device. Communication may occur wirelessly or wired depending on the functionality of the sending device. At Event 620, the requesting party receives a response that provides access to performance data files that include segments of the requested performance data as the files become available. In this regard, the response may provide for URLs associated with performance data files with the URLs being activated for access as the performance data files are generated.

The following provides numerous examples of eXtensible Markup Language (XML) protocol formatted request and response commands for third-party configuration of performance data monitoring/collection on wireless communication devices. In this regard, the third party is able to act in much the same manner as the network device, such as the user manager server, in requesting and configuring the monitoring and collection of performance data at the wireless devices. According to current aspects, commands may include "Get Mobile List", which commands the network device to supply a list of wireless devices currently being monitored for the third party; "MDM Generation", which requests the performance data collected from specific wireless communication devices over a requested period of time, where "MDM" stands for the Mobile Diagnostic Monitor™ file format, where in some aspects the network device converts the collected data from an original format into the MDM format—it should be noted, however, that the network device may be operable to provide the collected data in any desired format—as such, the "MDM Generation" command may also be referred to as a "File Generation" command where the end user may request the network device to provide the collected data corresponding to a previously-submitted "Command Mobile" command, as discussed below; "Register Mobiles", which commands the network device to register one or more wireless communication device for subsequent performance data collection; "Unregister Mobiles", which commands the network device to unregister one or mobile wireless communication devices; and "Command Mobiles", which configures the monitoring and collection of wireless device-based data, such as performance data, at the specified wireless devices, sends specific requests to upload performance data logs from the wireless communication devices and defines the start and stop times for logging performance data on the wireless communication devices. Each individual command will have a request communicated from the third party computing device and a response communicate back to the third party computing device from the network device.

The following paragraphs provide one example of a general structure of the XML formatted request commands, originating from the application executing on the third party requester computing device. It should be understood that the present aspect include, but are not limited to, this example. Additional XML-based structures may be utilized.

```
<?xml version="1.0"?>
<XML_CMD>
    <API_VER></API_VER>
        Indicates the version of the Application Programming Interface (API)
        Command.
    <APP_ID></APP_ID>
        Indicates the Application ID, for example:
            CDMA Performance: "0x010131fb"
            UMTS Performance: "0x01023058"
    <CMD_OPTIONS>
        <CMD_ID></CMD_ID>
            Indicates "Get Mobile List", "File Generation", "Register
            Mobiles", "Unregistered Mobiles" or "Command Mobiles"
        <CMD_PRIORITY></CMD_PRIORITY>
            Indicates a numerical value between 0 (Lowest) to 10 (Highest)
            to indicate the priority of the monitoring/collection operation.
            Note: Additional XML tags may be added, depending on
            <CMD_ID>
    </CMD_OPTIONS>
</XML_CMD>
```

The following provides the general format for a "Get Mobile List" XML request message. As previously noted, the "Get Mobile List" XML request message requests a listing of the current wireless devices being monitored on behalf of the third party requester:

```
<CMD_OPTIONS>
    <CMD_ID>101</CMD_ID>
        In this case, "101" = the Command ID for "Get Mobile List"
    <CMD_PRIORITY></CMD_PRIORITY>
        Indicates numerical value between 0 (Lowest) to 10 (Highest) to
        indicate the priority for the "Get Mobile List" request.
</CMD_OPTIONS>
```

The following is a specific example of a "Get Mobile List" XML request message:

```
<?xml version="1.0"?>
<XML_cmd>
    <API_VER>1</API_VER>
    <APP_ID>0x010131fb</APP_ID>
    <CMD_OPTIONS>
        <CMD_ID>101</CMD_ID>
        <CMD_PRIORITY>9</CMD_PRIORITY>
    </CMD_OPTIONS>
</XML_cmd>
```

The following provides the general format for a "FILE Generation" XML request message. As previously noted, the "File Generation" XML request message requests performance data files and sets the time period for collecting performance data:

```
<CMD_OPTIONS>
    <CMD_ID>102</CMD_ID>
```

```
        "102" = the Command ID for "MDM Generation"
    <CMD_PRIORITY></CMD_PRIORITY>
        Indicates numerical value between 0 (Lowest) to 10 (Highest) to
        indicate the priority of the "File Generation" request
    <PHONE_INFO>
        <MOBILE></MOBILE>
            Indicates mobile phone #
        <START_TIME></START_TIME>
            Indicates the start time.
            CDMA Performance: Time in GMT timestamp.
            UMTS Performance: Time in local timestamp of logs.
        <END_TIME></END_TIME>
            Indicates end time, for example:
            CDMA Performance: Time in GMT timestamp.
            UMTS Performance: Time in local timestamp of logs.
    </PHONE_INFO>
    <PHONE_INFO>...</PHONE_INFO>
        Multiple "<PHONE_INFO>" entries may be included as part of
        a single command.
</CMD_OPTIONS>
```

The following is a specific example of a "File Generation" XML request message in which two wireless devices are configured for performance data monitoring/collection:

```
<?xml version="1.0?>
<XML_CMD>
    <API_VER>1</API_VER>
    <APP_ID>0x010131fb</APP_ID>
    <CMD_OPTIONS>
        <CMD_ID>102</CMD_ID>
        <CMD_PRIORITY>7</CMD_PRIORITY>
        <PHONE_INFO>
            <MOBILE>8582459694</MOBILE>
                <START_TIME>1155106800</START_TIME>
                <END_TIME>1155193200</END_TIME>
        </PHONE_INFO>
        <PHONE_INFO>
            <MOBILE>8582450001</MOBILE>
                <START_TIME>1155157200</START_TIME>
                <END_TIME>1155159000</END_TIME>
        </PHONE_INFO>
    </CMD_OPTIONS>
</XML_CMD>
```

The following provides the general format for a "Register Mobiles" XML request message. As previously noted, the "Register Mobiles" XML request message requests registration of one or more wireless communication devices for subsequent performance data collection

```
<CMD_OPTIONS>
    <CMD_ID>103</CMD_ID>
        "103" = the Command ID for "Register Mobiles"
    <CMD_PRIORITY></CMD_PRIORITY>
        Indicates numerical value between 0 (Lowest) to 10 (Highest) to
        indicate the priority of the "Register Mobiles" request.
    <PHONE_INFO>
        <MOBILE></MOBILE>
            Mobile phone #
    </PHONE_INFO>
    <PHONE_INFO>...</PHONE_INFO>
        Multiple "<PHONE_INFO>" entries may be included as part of
        a single command.
</CMD_OPTIONS>
```

The following is a specific example of a "Register Mobiles" XML request message in which two wireless communication devices are registered for subsequent performance data monitoring:

```
<?xml version="1.0"?>
<XML_CMD>
    <API_VER>1</API_VER>
    <APP_ID>0x010131fb</APP_ID>
    <CMD_OPTIONS>
        <CMD_ID>103</CMD_ID>
        <CMD_PRIORITY>10</CMD_PRIORITY>
        <PHONE_INFO>
            <MOBILE>8582459694</MOBILE>
        </PHONE_INFO>
        <PHONE_INFO>
            <MOBILE>8582450001</MOBILE>
        </PHONE_INFO>
    </CMD_OPTIONS>
</XML_CMD>
```

The following provides the general format for an "Unregister Mobiles" XML request message. As previously noted, the "Unregister Mobiles" XML request message requests unregisteration of wireless communication devices for performance data monitoring. In this regard, unregistered wireless communication devices may not be included in a subsequent request to monitor/collect performance data without first, reregistering the device:

```
<CMD_OPTIONS>
    <CMD_ID>104</CMD_ID>
        "104" = the Command ID for "Unregister Mobiles" request.
    <CMD_PRIORITY></CMD_PRIORITY>
        Indicates numerical value between 0 (Lowest) to 10 (Highest) to
        indicate the priority of the "Unregister Mobiles" command.
    <PHONE_INFO>
        <MOBILE></MOBILE>
            Mobile phone #
    </PHONE_INFO>
    <PHONE_INFO>...</PHONE_INFO>
        Multiple "<PHONE_INFO>" entries may be included as part of
        a single command.
</CMD_OPTIONS>
```

The following is a specific example of a "Unregister Mobiles" XML request message in which two wireless communication devices are unregistered for performance data monitoring/collection:

```
<?xml version="1.0"?>
<XML_CMD>
    <API_VER>1</API_VER>
    <APP_ID>0x010131fb</APP_ID>
    <CMD_OPTIONS>
        <CMD_ID>104</CMD_ID>
        <CMD_PRIORITY>5</CMD_PRIORITY>
        <PHONE_INFO>
            <MOBILE>8582459694</MOBILE>
        </PHONE_INFO>
        <PHONE_INFO>
            <MOBILE>8582450001</MOBILE>
        </PHONE_INFO>
    </CMD_OPTIONS>
</XML_CMD>
```

The following provides the general format for a "Command Mobiles" XML request message. As previously noted, the "Command Mobiles" XML request message configures the monitoring and collection of performance data at the specified wireless devices. The commands may include, but are not limited to, logging behavior, uploading of performance data, response mode settings and configuration settings:

```
<CMD_OPTIONS>
    <CMD_ID>105</CMD_ID>
        105 = the Command ID for "Command Mobiles" request
    <CMD_PRIORITY></CMD_PRIORITY>
        Indicates numerical value between 0 (Lowest) to 10 (Highest) to
        indicate the priority of the "Command Mobiles" request.
    <MOBILE_CMD_LIST>
        <MOBILE_CMD>
            MOBILE_CMD_ID 1: Logging Behavior
            MOBILE_CMD_ID 2: Upload Logs
            MOBILE_CMD_ID 3: Response Mode Settings
            MOBILE_CMD_ID 4: Configuration Settings
        </MOBILE_CMD>
            Multiple "<MOBILE_CMD>" can be included as part of
            a single command for the supplied <PHONE_INFO>.
    </MOBILE_CMD_LIST>
    <PHONE_INFO>
        <MOBILE></MOBILE>
            Mobile phone #
    </PHONE_INFO>
    <PHONE_INFO>...</PHONE_INFO>
        Multiple "<PHONE_INFO>" entries may be included as part of
        a single command.
</CMD_OPTIONS>
```

The following the general format for a logging behavior command within a "Command Mobiles" XML request message:

```
<MOBILE_CMD>
    <MOBILE_CMD_ID>1</MOBILE_CMD_ID>
        "1" = ID for Logging Behavior
    <LOGGING_ID></LOGGING_ID>
        "1": Start Logging
        "2": Stop Logging
</MOBILE_CMD>
```

The following is a specific example of an a "Command Mobile" XML request message including a logging behavior command:

```
<?xml version="1.0"?>
<XML_CMD>
    <API_VER>1</API_VER>
    <APP_ID>0x010131fb</APP_ID>
    <CMD_OPTIONS>
        <CMD_ID>105</CMD_ID>
        <CMD_PRIORITY>2</CMD_PRIORITY>
        <MOBILE_CMD_LIST>
            <MOBILE_CMD>
                <MOBILE_CMD_ID>1</MOBILE_CMD_ID>
                <LOGGING_ID>1</LOGGING_ID>
            </MOBILE_CMD>
        </MOBILE_CMD_LIST>
        <PHONE_INFO>
            <MOBILE>8582459694</MOBILE>
        </PHONE_INFO>
        <PHONE_INFO>
            <MOBILE>8582450001</MOBILE>
        </PHONE_INFO>
    </CMD_OPTIONS>
</XML_CMD>
```

The following the general format for an upload logs (i.e., performance data) command within a "Command Mobiles" XML request message:

```
<MOBILE_CMD>
    - <MOBILE_CMD_ID>2</MOBILE_CMD_ID>
        "2" = ID for Upload Logs
</MOBILE_CMD>
```

The following is a specific example of an a "Command Mobile" XML request message including an upload logs command:

```
<?xml version="1.0"?>
<XML_CMD>
    <API_VER>1</API_VER>
    <APP_ID>0x010131fb</APP_ID>
    <CMD_OPTIONS>
        <CMD_ID>105</CMD_ID>
        <CMD_PRIORITY>6</CMD_PRIORITY>
        <MOBILE_CMD_LIST>
            <MOBILE_CMD>
                <MOBILE_CMD_ID>2</MOBILE_CMD_ID>
            </MOBILE_CMD>
        </MOBILE_CMD_LIST>
        <PHONE_INFO>
            <MOBILE>8582459694</MOBILE>
        </PHONE_INFO>
        <PHONE_INFO>
            <MOBILE>8582450001</MOBILE>
        </PHONE_INFO>
    </CMD_OPTIONS>
</XML_CMD>
```

The following the general format for response mode settings command within a "Command Mobiles" XML request message. The response mode settings may include, but are not limited to, normal setting, upload request decline setting and silent setting. These setting allows for setting the times for making a data call/uploading data, and define the times for which a data call/uploading of data will not be performed:

```
<MOBILE_CMD>
    <MOBILE_CMD_ID>3</MOBILE_CMD_ID>
        "3" = ID for Response Mode Settings
    <RSP_MODE></RSP_MODE>
        1: Normal
            Does not use Response Mode Start/End time
            (<RSP_MODE_START_HR>,
            <RSP_MODE_START_MIN>).
            These tags may be ignored if submitted.
        2: Upload Request Decline
            Uses Response Mode Start/End time
            (<RSP_MODE_START_HR>,
            <RSP_MODE_START_MIN>)
            to indicate the time range for the Response Mode.
        3: Silent
            Uses Response Mode Start/End time
            (<RSP_MODE_START_HR>,
            <RSP_MODE_START_MIN>)
            to indicate the time range for the Response Mode.
    <RSP_MODE_START_HR></RSP_MODE_START_HR>
        Specify with respect to UM (User Manager, e.g. the
        managing server) Time Zone
        Increment range (in hours): 00 to 23
    <RSP_MODE_START_MIN></RSP_MODE_START_MIN>
        Specify with respect to UM Time Zone
        Increment range (in minutes): 00 or 30
```

-continued

```
    <RSP_MODE_END_HR></RSP_MODE_END_HR>
        Specify with respect to UM Time Zone
        Increment range (in hours): 00 to
        23<RSP_MODE_END_MIN></RSP_MODE_END_MIN>
        Specify with respect to UM Time Zone
        Increment range (in minutes): 00 or 30
</MOBILE_CMD >
```

The following is a specific example of an a "Command Mobile" XML request message including a response mode settings command:

```
<?xml version="1.0"?>
<XML_CMD>
    <API_VER>1</API_VER>
    <APP_ID>0x010131fb</APP_ID>
    <CMD_OPTIONS>
        <CMD_ID>105</CMD_ID>
        <CMD_PRIORITY>6</CMD_PRIORITY>
        <MOBILE_CMD_LIST>
            <MOBILE_CMD>
                <MOBILE_CMD_ID>3</MOBILE_CMD_ID>
                <RSP_MODE>3</RSP_MODE>
                <RSP_MODE_START_HR>00
                </RSP_MODE_START_HR>
                <RSP_MODE_START_MIN>00
                </RSP_MODE_START_MIN>
                <RSP_MODE_END_HR>14
                </RSP_MODE_END_HR>
                <RSP_MODE_END_MIN>30
                </RSP_MODE_END_MIN
            </MOBILE_CMD>
        </MOBILE_CMD_LIST>
        <PHONE_INFO>
            <MOBILE>8582459694</MOBILE>
        </PHONE_INFO>
        <PHONE_INFO>
            <MOBILE>8582450001</MOBILE>
        </PHONE_INFO>
    </CMD_OPTIONS>
</XML_CMD>
```

The following the general format for configuration settings within a "Command Mobiles" XML request message. The configuration settings may include, but are not limited to, data collection, communication, occurrences and threshold:

```
<MOBILE_CMD>
    <MOBILE_CMD_ID>4</MOBILE_CMD_ID>
        "4" = ID for Configuration Settings
    <CONFIG>
        CONFIG_ID 1: Data Collection
        CONFIG_ID 2: Communication
        CONFIG_ID 3: Occurrences
        CONFIG_ID 4: Threshold
    </CONFIG>
        Can submit multiple '<CONFIG>' as part of a single command
        within one <MOB_CMD> block
</MOBILE_CMD>
```

The following the general format for a configuration settings command including data collection within a "Command Mobiles" XML request message:

```
<CONFIG>
    <CONFIG_ID>1</CONFIG_ID>
        "1" = Configuration ID for Data Collection
```

```
        <PRE_TIME_GLOBAL></PRE_TIME_GLOBAL>
            Ignored if <PRE_TIME_LOCAL> exists.
            Increment range (in seconds): 0 to 15.
            To use default values, set this to -1.
        <POST_TIME_GLOBAL></POST_TIME_GLOBAL>
            Ignored if <POST_TIME_LOCAL> exists.
            Increment range (in seconds): 0 to 15.
            To use default values, set this to -1.
        <CUSTOM_LOGGING>
            <CUSTOM_LOGGING_ID></CUSTOM_LOGGING_ID>
            <PRE_TIME_LOCAL></PRE_TIME_LOCAL>
                Overwrites <PRE_TIME_GLOBAL> if exists
                Ignored if CUSTOM_LOGGING_ID is for a default
                category.
            <POST_TIME_LOCAL></POST_TIME_LOCAL>
                Overwrites <POST_TIME_GLOBAL> if exists
                Ignored if CUSTOM_LOGGING_ID is for a Default
                category.
        </CUSTOM_LOGGING>
            Can submit multiple '<CUSTOM_LOGGING>' as part of a
            single command within one <CONFIG> block
    </CONFIG>
```

The following is a specific example of a "Command Mobile" XML request message including a configuration settings command for data collection:

```
<?xml version="1.0"?>
<XML_CMD>
    <API_VER>1</API_VER>
    <APP_ID>0x010131fb</APP_ID>
    <CMD_OPTIONS>
        <CMD_ID>105</CMD_ID>
        <CMD_PRIORITY>6</CMD_PRIORITY>
        <MOBILE_CMD_LIST>
            <MOBILE_CMD>
                <MOBILE_CMD_ID>4</MOBILE_CMD_ID>
                <CONFIG>
                    <CONFIG_ID>1</CONFIG_ID>
                    <PRE_TIME_GLOBAL>-1</PRE_TIME_GLOBAL>
                    <POST_TIME_GLOBAL>-1
                    </POST_TIME_GLOBAL>
                    <CUSTOM_LOGGING>
                        <CUSTOM_LOGGING_ID>1</
                            CUSTOM_LOGGING_ID>
                    </CUSTOM_LOGGING>
                    <CUSTOM_LOGGING>
                        <CUSTOM_LOGGING_ID>4</
                            CUSTOM_LOGGING_ID>
                        <PRE_TIME_LOCAL>15</PRE_TIME_LOCAL>
                        <POST_TIME_LOCAL>10</POST_TIME_LOCAL
                    </CUSTOM_LOGGING>
                </CONFIG>
            </MOBILE_CMD>
        </MOBILE_CMD_LIST>
        <PHONE_INFO>
            <MOBILE>8582459694</MOBILE>
        </PHONE_INFO>
    </CMD_OPTIONS>
</XML_CMD>
```

The following the general format for a configuration settings command including communication within a "Command Mobiles" XML request message:

```
<CONFIG>
    <CONFIG_ID>2</CONFIG_ID>
    <UPLOAD_REQ_TIME></UPLOAD_REQ_TIME>
        Increment range, for example: 10 minutes, 20 minutes, ... 50
        minutes, 1 hour, 2 hours, ... 24 hours. To disable, for example,
        set to -1.
        Time may be submitted in minutes.
    <COLLECTION_WATERMARK>
    </COLLECTION_WATERMARK>
        Increment range (in percent), for example: 20 to 100.
    <AGPS_PDE_IP></AGPS_PDE_IP>
        The IP address or other identifier of an AGPS Server.
    <AGPS_PDE_PORT></AGPS_PDE_PORT>
        The server port of an AGPS Server.
    <UM_URL></UM_URL>
        The URL address of the UM (User Manager server, e.g. the
        managing server).
    <EFS_MODE></EFS_MODE>
        0: Normal (Stop When Full)
        1: Wrap-Around
    <EFS_ALLOWANCE></EFS_ALLOWANCE>
        Allowed amount of memory, such as electronic filing system
        (EFS) memory; For example, can provide from an increment
        range (in KB): 512, 768, 1024, 1280, 1536, 1792, 2048
    <POWER_UP_SILENT></POWER_UP_SILENT>
        Increment range (in minutes): 3 to 120
    <ACB_INTERVAL></ACB_INTERVAL>
        Increment range (in hours): 1 to 24. To disable, set to -1.
    <MOBILE_OPTIONS>
        <MOBILE_OPTIONS_ID></MOBILE_OPTIONS_ID>
            1: Disable Logging when roaming
            2: Disable Data Call when roaming
            3: Disable GPS fixes when roaming
            4: Disable Logging when uploading data
    </MOBILE_OPTIONS>
</CONFIG>
```

The following is an example the default values for a "Command Mobile" XML request message including a communication command for data collection:

```
        <UPLOAD_REQ_TIME>60</UPLOAD_REQ_TIME>
            Unit in minutes
        <COLLECTION_WATERMARK>90
        </COLLECTION_WATERMARK>
            Unit in percentage
        <AGPS_PDE_IP>199.106.121.85
        </AGPS_PDE_IP><AGPS_PDE_PORT>491
1</AGPS_PDE_PORT><UM_URL></UM_URL>
            URL address of UM (User Manager server).
        <EFS_MODE>0</EFS_MODE>
            0 indicates: Normal (Stop When Full)
        <EFS_ALLOWANCE>512</EFS_ALLOWANCE>
            Unit in KB
        <POWER_UP_SILENT>30</POWER_UP_SILENT>
            Unit in minutes
        <ACB_INTERVAL>24</ACB_INTERVAL>
            Unit in hours
        <MOBILE_OPTIONS>
            If Empty = Do not disable any
        </MOBILE_OPTIONS>
```

The following is a specific example of a "Command Mobile" XML request message including a communication command for data collection:

```
<?xml version="1.0"?>
<XML_CMD>
    <API_VER>1</API_VER>
    <APP_ID>0x010131fb</APP_ID>
    <CMD_OPTIONS>
        <CMD_ID>105</CMD_ID>
        <CMD_PRIORITY>6</CMD_PRIORITY>
        <MOBILE_CMD_LIST>
            <MOBILE_CMD>
                <MOBILE_CMD_ID>4</MOBILE_CMD_ID>
                <CONFIG>
                    <CONFIG_ID>2</CONFIG_ID>
                    <UPLOAD_REQ_TIME>30
```

```
                </UPLOAD_REQ_TIME>
                <COLLECTION_WATERMARK>90
                  </COLLECTION_WATERMARK>
                <AGPS_PDE_IP>199.106.121.85</AGPS_PDE_IP>
                <AGPS_PDE_PORT>4911</AGPS_PDE_PORT>
                <UM_URL>https://localhost.qualcomm.com:9600
                  </UM_URL>
                <EFS_MODE>1</EFS_MODE>
                <EFS_ALLOWANCE>1792</EFS_ALLOWANCE>
                <POWER_UP_SILENT>3</POWER_UP_SILENT>
                <ACB_INTERVAL>6</ACB_INTERVAL>
                <MOBILE_OPTIONS>
                    <MOBILE_OPTIONS_ID>1
                       </MOBILE_OPTIONS_ID>
                    <MOBILE_OPTIONS_ID>4
                       </MOBILE_OPTIONS_ID>
                </MOBILE_OPTIONS>
            </CONFIG>
        </MOBILE_CMD>
    </MOBILE_CMD_LIST>
    <PHONE_INFO>
        <MOBILE>8582459694</MOBILE>
    </PHONE_INFO>
  </CMD_OPTIONS>
</XML_CMD>
```

The XML formatted response commands are sent from the network device, such as the user manager, in response to the receipt of a request command. The response command may characteristically have the following general structure:

```
<?xml version="1.0"?>
<XML_CMD_RSP>
    <API_VER></API_VER>
        Indicates the version of the API Command
    <APP_ID></APP_ID>
        Application ID:
           CDMA Performance: "0x010131fb"
           UMTS Performance: "0x01023058"
    <SEQ_NUM></SEQ_NUM>
        Sequence Number to track this transaction. Submit with the
        <UM_SERVER_RESULT_URL> to obtain status.
    <SEQ_STATUS></SEQ_STATUS>
        Indicates status or error of sent command.
    <UM_SERVER_RESULT_URL>
    </UM_SERVER_RESULT_URL>
        The URL to connect to in order to obtain server result status for
        this request.
</XML_CMD_RSP>
```

The following is a specific example of an XML response message:

```
<?xml version="1.0"?>
<XML_CMD_RSP>
   <API_VER>1</API_VER>
   <APP_ID>0x010131fb</APP_ID>
   <SEQ_NUM>17</SEQ_NUM>
   <SEQ_STATUS>0x00010001</SEQ_STATUS>
   <UM_SERVER_RESULT_URL>UM_server_status.php
      </UM_SERVER_RESULT_URL>
</XML_CMD_RSP>The XML formatted response result commands
may characteristically have the following general structure:
<?xml version="1.0"?>
<XML_RESULT>
<API_VER></API_VER>
    Indicates the version of this API Command.
<APP_ID></APP_ID>
    Indicates the application ID:
      CDMA Performance: "0x010131fb"
      UMTS Performance: "0x01023058"
<SEQ_NUM></SEQ_NUM>
```

```
    Sequence Number to track this transaction. Submit with the
    <UM_SERVER_RESULT_URL> to obtain status.
<SEQ_STATUS></SEQ_STATUS>
    Indicates the overall status of the Sequence Number.
<RESULTS>
    <RESULTS> blocks may differ based on the command
</RESULTS>
</XML_RESULT>
```

The following provides the general format for a "Get Mobile List" XML result message. As previously noted, the "Get Mobile List" XML result message communicates a listing of the current wireless devices being monitored on behalf of the third party requester:

```
<RESULTS>
   <MOBILE_LIST>
      <PHONE_INFO>
         <MOBILE></MOBILE>
             Indicates a single phone number in UM.
         <USER_NAME></USER_NAME>
             Name associated with this mobile phone number.
         <ESN></ESN>
             ESN associated with this mobile phone number.
         <CARRIER></CARRIER>
             Carrier associated with this mobile phone number.
         <MANUFACTURER></MANUFACTURER>
             Manufacturer associated with this mobile phone number.
         <MODEL></MODEL>
             Model associated with this mobile phone number.
         <VERSION></VERSION>
             Version of the app on the mobile with this phone number.
         <FIRMWARE></FIRMWARE>
             Firmware on the mobile with this phone number.
         <REGISTER_STATUS></REGISTER_STATUS>
             The registration status of the mobile in UM
                0: Mobile is not registered with UM
                1: Mobile is registered with UM
      </PHONE_INFO>
      <PHONE_INFO>...</PHONE_INFO>
         Multiple <PHONE_INFO> to list all phone numbers in UM
   </MOBILE_LIST>
</RESULTS>
```

The following is a specific example of a "Get Mobile List" XML response message:

```
<?xml version="1.0"?>
<XML_RESULT>
   <API_VER>1</API_VER>
   <APP_ID>0x01023c40</APP_ID>
   <SEQ_NUM>1</SEQ_NUM>
   <SEQ_STATUS>0x00010003</SEQ_STATUS>
   <RESULTS>
      <MOBILE_LIST>
         <PHONE_INFO>
            <MOBILE>8580000001</MOBILE>
            <USER_NAME>mcta_test1</USER_NAME>
            <ESN>DEADBEEF</ESN>
            <CARRIER>Verizon</CARRIER>
            <MANUFACTURER>Motorola</MANUFACTURER>
            <MODEL>v710</MODEL>
            <VERSION>1.8.01</VERSION>
            <FIRMWARE>dmss6101</FIRMWARE>
            <REGISTER_STATUS>1</REGISTER_STATUS>
         </PHONE_INFO>
         <PHONE_INFO>
            <MOBILE>8580000002</MOBILE>
            <USER_NAME>mcta_test2</USER_NAME>
            <ESN>DEADBEEF</ESN>
            <CARRIER>Verizon</CARRIER>
```

```
        <MANUFACTURER>Motorola</MANUFACTURER>
        <MODEL>v712</MODEL>
        <VERSION>1.8.02</VERSION>
        <FIRMWARE>dmss6102</FIRMWARE>
        <REGISTER_STATUS>0</REGISTER_STATUS>
      </PHONE_INFO>
    </MOBILE_LIST>
  </RESULTS>
</XML_RESULT>
```

The following provides the general format for a "File Generation" XML response message. As previously noted, the "File Generation" XML response message communicates performance data files and sets the time period for collecting performance data. It should be noted that throughout this example, the abbreviation "MDM" corresponds to "File", e.g. the data files corresponding to a respective Command Mobile request that requested that one or more devices be configured for collection of data based on the configuration.

```
<RESULTS>
  <MDM_LIST>
    In this example, this refers to the list of each "MDM" or "File" of
    collected data, based on the request.
    <MDM>
      In this example, "MDM" refers to each specific File of
      collected data
      <UM_MDM_URL></UM_MDM_URL>
        In one example, this includes the respective URL to the script to
        download the MDM file starting at the ServerAPI level.
        May be appended to the UM URL to retrieve MDM file.
      <MDM_STATUS></MDM_STATUS>
        Indicates the status of the File Generation request.
      <MDM_SIZE></MDM_SIZE>
        The size of the File or Log, e.g. in bytes.
      <START_TIME></START_TIME>
        Start time.
      <END_TIME></END_TIME>
        End time.
    </MDM>
    <MDM>...</MDM>
        As noted above, multiple <MDM> may be included to list all
        Files requested
  </MDM_LIST>
</RESULTS>
```

The following is a specific example of a "File Generation" XML response message:

```
<?xml version="1.0"?>
<XML_RESULT>
  <API_VER>1</API_VER>
  <APP_ID>0x010131fb</APP_ID>
  <SEQ_NUM>17</SEQ_NUM>
  <SEQ_STATUS>0x00010002</SEQ_STATUS>
  <RESULTS>
    <MDM_LIST>
      <MDM>
        <UM_MDM_URL>UM_get_mdm_log.php?szPath=0x01013
        1fb/2006_08_18/17/8582459694_1155106800_1155150000.
        mdm</UM_MDM_URL>
        <MDM_STATUS>0x00010003</MDM_STATUS>
        <MDM_SIZE>1213220</MDM_SIZE>
        <START_TIME>1155106800</START_TIME>
        <END_TIME>1155150000</END_TIME>
      </MDM>
      <MDM>
        <UM_MDM_URL>UM_get_mdm_log.php?szPath=0x01013
        1fb/2006_08_18/17/8582459694_1155150000_1155193200.
        mdm</UM_MDM_URL>
        <MDM_STATUS>0x00010002</MDM_STATUS>
        <MDM_SIZE>0</MDM_SIZE>
        <START_TIME>1155150000</START_TIME>
        <END_TIME>1155193200</END_TIME>
      </MDM>
      <MDM>
        <UM_MDM_URL>UM_get_mdm_log.php?szPath=0x01013
        1fb/2006_08_18/17/8582450001_1155193200_1155236400.
        mdm</UM_MDM_URL>
        <MDM_STATUS>0x00010001</MDM_STATUS>
        <MDM_SIZE>0</MDM_SIZE>
        <START_TIME>1155193200</START_TIME>
        <END_TIME>1155236400</END_TIME>
      </MDM>
    </MDM_LIST>
  </RESULTS>
</XML_RESULT>
```

The following provides the general format for a "Register Mobiles" XML response message. As previously noted, the "Register Mobiles" XML response message communicates registration status of wireless communication devices that have been requested to be registered:

```
<RESULTS>
  <SREGISTER_LIST>
    <REGISTER>
      <MOBILE></MOBILE>
        Indicates the mobile number to register.
      <REGISTER_STATUS></REGISTER_STATUS>
        Indicates the registration status of the mobile in UM.
          0: Mobile is not registered with UM.
          1: Mobile is registered with UM.
      <CMD_SEQ_NUM></CMD_SEQ_NUM>
        Indicates the UM Sequence Number for the command sent
        When command has not been sent yet, this value will be 0.
      <CMD_STATUS></CMD_STATUS>
        The command status for <CMD_SEQ_NUM>.
      <ACB_SEQ_NUM></ACB_SEQ_NUM>
        The UM Sequence Number that is associated to the
        <CMD_SEQ_NUM> as a result of ACB
      <ACB_STATUS></ACB_STATUS>
        Indicates the command status for <ACB_SEQ_NUM>.
    </REGISTER>
    <REGISTER>...</REGISTER>
        Multiple <REGISTER> to list status of all mobiles.
  <REGISTER_LIST>
</RESULTS>
```

The following is a specific example of a "Register Mobiles" XML response message:

```
<?xml version="1.0"?>
<XML_RESULT>
  <API_VER>1</API_VER>
  <APP_ID>0x010131fb</APP_ID>
  <SEQ_NUM>250</SEQ_NUM>
  <SEQ_STATUS>0x00010003</SEQ_STATUS>
  <RESULTS>
    <STATUS_LIST>
      <REGISTER>
        <MOBILE>8582459694</MOBILE>
        <REGISTER_STATUS>1</REGISTER_STATUS>
        <CMD_SEQ_NUM>41</CMD_SEQ_NUM>
        <CMD_STATUS>0x0003000C</CMD_STATUS>
        <ACB_SEQ_NUM>42</ACB_SEQ_NUM>
        <ACB_STATUS>0x00030002</ACB_STATUS>
      </REGISTER>
      <REGISTER>
        <MOBILE>8582450001</MOBILE>
        <REGISTER_STATUS>0</REGISTER_STATUS>
```

```
        <CMD_SEQ_NUM>359</CMD_SEQ_NUM>
        <CMD_STATUS>0x0003000C</CMD_STATUS>
        <ACB_SEQ_NUM>0</ACB_SEQ_NUM>
        <ACB_STATUS>0x00030001</ACB_STATUS>
      </REGISTER>
    </STATUS_LIST>
  </RESULTS>
</XML_RESULT>
```

The following provides the general format for an "Unregister Mobiles" XML response message. As previously noted, the "Unregister Mobiles" XML response message communicates the registration status of wireless communication devices that have been requested to be unregistered:

```
<RESULTS>
  <STATUS_LIST>
    <UNREGISTER>
      <MOBILE></MOBILE>
        Indicates the mobile number to unregister.
      <REGISTER_STATUS></REGISTER_STATUS>
        Indicates the registration status of the mobile in UM.
          0: Mobile is not registered with UM
          1: Mobile is registered with UM
      <CMD_SEQ_NUM></CMD_SEQ_NUM>
        Indicates the UM Sequence Number for the command sent
      <CMD_STATUS></CMD_STATUS>
        Indicates the command status for
      <CMD_SEQ_NUM>.<ACB_SEQ_NUM></ACB_SEQ_NUM>
        The UM Sequence Number that is associated to the
        <CMD_SEQ_NUM> as a result of ACB
      <ACB_STATUS></ACB_STATUS>
        Indicates the command status for <ACB_SEQ_NUM>.
    </UNREGISTER>
    <UNREGISTER>...</UNREGISTER>
      May include multiple <UNREGISTER> to list status of all
      mobiles
  </STATUS_LIST>
</RESULTS>
```

The following is a specific example of a "Unregister Mobiles" XML response message:

```
<?xml version="1.0"?>
<XML_RESULT>
  <API_VER>1</API_VER>
  <APP_ID>0x010131fb</APP_ID>
  <SEQ_NUM>250</SEQ_NUM>
  <SEQ_STATUS>0x00010003</SEQ_STATUS>
  <RESULTS>
    <STATUS_LIST>
      <UNREGISTER>
        <MOBILE>8582459694</MOBILE>
        <REGISTER_STATUS>1</REGISTER_STATUS>
        <CMD_SEQ_NUM>41</CMD_SEQ_NUM>
        <CMD_STATUS>0x0003000C</CMD_STATUS>
        <ACB_SEQ_NUM>42</ACB_SEQ_NUM>
        <ACB_STATUS>0x00030002</ACB_STATUS>
      </UNREGISTER>
      <UNREGISTER>
        <MOBILE>8582450001</MOBILE>
        <REGISTER_STATUS>0</REGISTER_STATUS>
        <CMD_SEQ_NUM>359</CMD_SEQ_NUM>
        <CMD_STATUS>0x0003000C</CMD_STATUS>
        <ACB_SEQ_NUM>0</ACB_SEQ_NUM>
        <ACB_STATUS>0x00030001</ACB_STATUS>
      </UNREGISTER>
    </STATUS_LIST>
  </RESULTS>
</XML_RESULT>
```

The following provides the general format for a "Command Mobiles" XML response message. As previously noted, the "Command Mobiles" XML response message confirms the configuration of the monitoring and collection of performance data at the specified wireless devices. The commands may include, but are not limited to, logging behavior, uploading of performance data, response mode settings and configuration settings:

```
<RESULTS>
  <MOBILE_CMD_LIST>
    <MOBILE_CMD>
      <MOBILE_CMD_ID></MOBILE_CMD_ID>
    </MOBILE_CMD>
  </MOBILE_CMD_LIST>
    Indicates details on <MOBILE_CMD_LIST>.<STATUS_LIST>
    <COMMAND>
      <REGISTER_STATUS></REGISTER_STATUS>
        The registration status of the mobile in UM
          0: Mobile is not registered with UM
          1: Mobile is registered with UM
      <CMD_SEQ_NUM></CMD_SEQ_NUM>
        The UM Sequence Number for the command sent
      <CMD_STATUS></CMD_STATUS>
        The command status for <CMD_SEQ_NUM>.
      <ACB_SEQ_NUM></ACB_SEQ_NUM>
        The UM Sequence Number that is associated to the
        <CMD_SEQ_NUM> as a result of ACB.
      <ACB_STATUS></ACB_STATUS>
        The command status for <ACB_SEQ_NUM>.
    </COMMAND>
    <COMMAND>...</COMMAND>
      May include multiple <COMMAND> to list status of all mobiles
  </STATUS_LIST>
</RESULTS>
```

The following is a specific example of a "Command Mobiles" XML response message:

```
<?xml version="1.0"?>
<XML_RESULT>
  <API_VER>1</API_VER>
  <APP_ID>0x010131fb</APP_ID>
  <SEQ_NUM>250</SEQ_NUM>
  <SEQ_STATUS>0x00010003</SEQ_STATUS>
  <RESULTS>
    <MOBILE_CMD_LIST>
      <MOBILE_CMD>
        <MOBILE_CMD_ID>1</MOBILE_CMD_ID>
        <LOGGING_ID>1</LOGGING_ID>
      </MOBILE_CMD>
      <MOBILE_CMD>
        <MOBILE_CMD_ID>2</MOBILE_CMD_ID>
      </MOBILE_CMD>
      <MOBILE_CMD>
        <MOBILE_CMD_ID>3</MOBILE_CMD_ID>
        <RSP_MODE>1</RSP_MOD>
      </MOBILE_CMD>
    </MOBILE_CMD_LIST>
    <STATUS_LIST>
      <COMMAND>
        <MOBILE>8582459694</MOBILE>
        <REGISTER_STATUS>1</REGISTER_STATUS>
        <CMD_SEQ_NUM>41</CMD_SEQ_NUM>
        <CMD_STATUS>0x0003000C</CMD_STATUS>
        <ACB_SEQ_NUM>42</ACB_SEQ_NUM>
        <ACB_STATUS>0x00030009</ACB_STATUS>
      </COMMAND>
      <COMMAND>
        <MOBILE>8582450001</MOBILE>
        <REGISTER_STATUS>0</REGISTER_STATUS>
        <CMD_SEQ_NUM>359</CMD_SEQ_NUM>
        <CMD_STATUS>0x0003000C</CMD_STATUS>
        <ACB_SEQ_NUM>0</ACB_SEQ_NUM>
```

```
            <ACB_STATUS>0x00030001</ACB_STATUS>
        </COMMAND>
    </STATUS_LIST>
  </RESULTS>
</XML_RESULT>
```

The following provides one non-limiting example of possible status code responses sent from the user manager network device to the requesting party, e.g. these codes are Server API Command Queue Status messages:

0x00010001: Indicates performance data request is currently in the queue.
0x00010002: Indicates performance data request is currently running.
0x00010003: Indicates performance data request has been completed.
0x00010004: Indicates performance data request has expired.
0x00010005: Indicates an error in the performance data request.

The following provides specific non-limiting examples of error codes sent from the user manager network device to the requesting party:

0x00020001: Indicates an Invalid Server API Login Username/Password.
0x00020002: Indicates an Invalid Server API Login Type.
0x00020003: Indicates a Weak Password.
0x00020004: Indicates a Bad XML Format in the request.
0x00020005: Indicates an Invalid Server API Version.
0x00020006: Indicates an Invalid App ID.
0x00020007: Indicates an Invalid Command ID.
0x00020008: Indicates an Invalid Command Priority.
0x00020009: Indicates a Phone Info block does not exist.
0x0002000A: Indicates an Invalid Mobile Number.
0x0002000B: Indicates an Invalid MDM, or File Generation, Start Time.
0x0002000C: Indicates an Invalid MDM, or File Generation, End Time.
0x0002000D: Indicates a Bad Database Operation.
0x0002000E: Indicates a Bad Sequence Number.

The following provides specific non-limiting examples of a command mobile status message sent from the user manager network device to the requesting party:

0x00030001: the SMS message including the configuration requested by the Command Mobile command has not yet been sent to the mobile station (MS) or handset
  Status=N/A
0x00030002: SMS is received by the handset
  Status=Acknowledgement (ACK): Message Received
0x00030003: SMS is received but the handset is busy
  Status=ACK: BUSY
0x00030004: SMS is received but no data to upload
  Status=ACK: NO Data
0x00030005: SMS is received but the parameter in the CONFIG command is invalid
  Status=Not Acknowledged (NAK): Invalid Parameter
0x00030006: SMS is received but the BNM client version is not supported
  Status=NAK: Invalid Version
0x00030007: SMS is received but the BNM client is currently uploading
  Status=ACK: Currently Uploading
0x00030008: SMS is received but the BNM client is currently Registering
  Status=NAK: Registering
0x00030009: SMS is received and the CONFIG is processed successfully
  Status=ACK: Configuration Completed
0x0003000A: SMS is received but the status is not recognized by UM
  Status=NAK: Invalid Response
0x0003000B: No pending transaction
  Status=Ready
0x0003000C: SMS is sent successfully
  Status=SMS: Sent
0x0003000D: SMS failed to be sent out
  Status=SMS: Failed to Send
0x0003000E: SMS is sent successfully but no response from handset within a timeout interval
  Status=SMS: Timeout
0x0003000F: SMS failed to be sent out because it does not fit in a single SMS payload
  Status=SMS: Failed (SMS Too Long)
0x00030010: Upload Request (UR) is declined
  Status=NAK: UR Declined The following provides specific non-limiting examples of parser error codes, indicating an error in the XML formatted request, as sent from the user manager network device to the requesting party:

0x00040001: XML_ERROR_NO_MEMORY
0x00040002: XML_ERROR_SYNTAX
0x00040003: XML_ERROR_NO_ELEMENTS
0x00040004: XML_ERROR_INVALID_TOKEN
0x00040005: XML_ERROR_UNCLOSED_TOKEN
0x00040006: XML_ERROR_PARTIAL_CHAR
0x00040007: XML_ERROR_TAG_MISMATCH
0x00040008: XML_ERROR_DUPLICATE_ATTRIBUTE
0x00040009: XML_ERROR_JUNK_AFTER_DOC_ELEMENT
0x0004000A: XML_ERROR_PARAM_ENTITY_REF
0x0004000B: XML_ERROR_UNDEFINED_ENTITY
0x0004000C: XML_ERROR_RECURSIVE_ENTITY_REF
0x0004000D: XML_ERROR_ASYNC_ENTITY
0x0004000E: XML_ERROR_BAD_CHAR_REF
0x0004000F: XML_ERROR_BINARY_ENTITY_REF
0x00040010: XML_ERROR_EXTERNAL_ENTITY_REF
0x00040011: XML_ERROR_MISPLACED_XML_PI
0x00040012: XML_ERROR_UNKNOWN_ENCODING
0x00040013: XML_ERROR_INCORRECT_ENCODING
0x00040014: XML_ERROR_UNCLOSED_CDATA_SECTION
0x00040015: XML_ERROR_EXTERNAL_ENTITY_HANDLING

The following provides non-limiting examples of codes for custom logging IDs, e.g. IDs of data packets, in a Code Division Multiple Access (CDMA) network:

Group 1—Collect RF Packet 0x102D
  0x01010001: Access Failure
  0x01010002: Call Drop
  0x01010003: Idle Failure
  0x01010004: Out of Service
Group 2—Collect RF Packet 0x11A2
  0x01020001: Access Failure
  0x01020002: Call Drop
  0x01020003: Idle Failure
  0x01020004: Out of Service
Group 3 (Third Party Logging)
  0x01030001: Access Failure 0x01030002: Call Drop
0x01030003: Idle Failure
Access Failure Details—Group 1
  0x01040001: Access Probe
  0x01040002: Base Station Position
  0x01040003: Frame Error
  0x01040004: GPS Position
  0x01040005: NLUM (Neighbor List Update Msg.)
  0x01040006: Searcher and Finger
  0x01040007: SessionEx Message
  0x01040008: Sync Channel Msg
Call Drop Details—Group 1
  0x01050001: Base Station Position
  0x01050002: Frame Error
  0x01050003: GPS Position
  0x01050004: In-Traffic SPM
  0x01050005: NLUM
  0x01050006: SCCM (Service Connect Completion Msg.)
  0x01050007: Searcher and Finger
  0x01050008: SessionEx Message
  0x01050009: Sync Channel Msg
Idle Failure—Details Group 1
  0x01060001: Base Station Position
  0x01060002: Frame Error
  0x01060003: GPS Position
  0x01060004: NLUM
  0x01060005: Searcher and Finger
  0x01060006: Sync Channel Msg
Out of Service Details—Group 1
  0x01070001: CM (Call Manager) State Information
  0x01070002: Event SD (Service Determination) Action
  0x01070003: GPS
  0x01070004: Searcher and Finger
Access Failure Details—Group 2
  0x01080001: Access Probe
  0x01080002: Base Station Position
  0x01080003: Frame Error
  0x01080004: GPS Position
  0x01080005: Generalized Searcher
  0x01080006: NLUM
  0x01080007: SessionEx Message
  0x01080008: Sync Channel Msg
Call Drop Details—Group 2
  0x01090001: Base Station Position
  0x01090002: Frame Error
  0x01090003: GPS Position
  0x01090004: Generalized Searcher
  0x01090005: In-Traffic SPM (Service Parameter Msg.)
  0x01090006: NLUM
  0x01090007: SCCM
  0x01090008: SessionEx Message
  0x01090009: Sync Channel Msg
Idle Failure Details—Group 2
  0x010A0001: Base Station Position
  0x010A0002: Frame Error
  0x010A0003: GPS Position
  0x010A0004: Generalized Searcher
  0x010A0005: NLUM
  0x010A0006: Sync Channel Msg
Out of Service Details—Group 2
  0x010B0001: CM State Information
  0x010B0002: Event SD Action
  0x010B0003: GPS
  0x010B0004: Generalized Searcher
Access Failure Details—Group 3 (Third Party Logging)
  0x010C0001: CAM (Channel Assignment Msg.)
  0x010C0002: CLM (Channel List Msg.)
  0x010C0003: ECAM (Extended CAM)
  0x010C0004: ECLM (Extended CLM)
  0x010C0005: ENLM (Extended NLM)
  0x010C0006: EORM (Extended Order Msg.)
  0x010C0007: GNLM (General NLM)
  0x010C0008: NLM
  0x010C0009: ORM (1x) (Order List Msg.-1x)
  0x010C000A: ORM (95)
  0x010C000B: PORDM (Paging Channel Order Msg.)
  0x010C000C: PRM (1x) (Access Page Response Msg)
  0x010C000D: PRM (95)
  0x010C000E: SPM (Service Parameter Msg.)
  0x010C000F: Sync Channel Msg
Call Drop Details—Group 3 (Third Party Logging)
  0x010D0001: CAM
  0x010D0002: CLM
  0x010D0003: ECAM
  0x010D0004: ECLM
  0x010D0005: ENLM
  0x010D0006: ENLUM
  0x010D0007: EORM
  0x010D0008: ESCAM
  0x010D0009: FORDM (Fwd. Traffic Chan. Order Msg.)
  0x010D000A: GNLM
  0x010D000B: HCM (Handoff Completion Msg.)
  0x010D000C: HDM (Handoff Direction Msg.)
  0x010D000D: In-Traffic SPM
  0x010D000E: NLM
  0x010D000F: NLUM
  0x010D0010: PORDM
  0x010D0011: RORDM
  0x010D0012: SCAM (Supplemental Chan. Assign. Msg.)
  0x010D0013: SCCM
  0x010D0014: SCM (Service Connect Msg.)
  0x010D0015: SPM
  0x010D0016: Sync Channel Msg
  0x010D0017: UHDM (Universal Handoff Dir. Msg.)
  0x010D0018: EHDM (Extended HDM)
  0x010D0019: PSMM (Pilot Strength Measurement Msg.)
Idle Failure Details—Group 3 (Third Party Logging)
  0x010E0001: GHDM
  0x010E0002: CAM
  0x010E0003: CLM
  0x010E0004: ECAM
  0x010E0005: ECLM
  0x010E0006: ENLM
  0x010E0007: GNLM
  0x010E0008: NLM
  0x010E0009: PORDM
  0x010E000A: SPM
  0x010E000B: Sync Channel MsgContinuous collection
  0x010F0001: EHDM
  0x010F0002: EVDO Call Setup
  0x010F0003: EVDO Connection Release
  0x010F0004: EVDO Data Rate Control
  0x010F0005: EVDO Handoff State
  0x010F0006: EVDO Signaling
  0x010F0007: GHDM
  0x010F0008: PSMM
Handoff
  0x01100001: 1x<->EVDO
  0x01100002: Hard handoff
  0x01100003: Idle handoff 0x01100004: Soft handoff The following provides non-limiting examples of codes for custom logging IDs in a Uniform Mobile Telecommunications System (UMTS) network:

Group 1 (Request GSM Packet 0x50720n Failure Events)
- 0x02010001: Access Failure
- 0x02010002: Call Drop
- 0x02010003: Handover
- 0x02010004: Out of Service Group 2 (Request GSM Packet 0x5072 Every Second)
- 0x02020001: Access Failure
- 0x02020002: Call Drop
- 0x02020003: Handover
- 0x02020004: Out of Service Access Failure Details—Group 1 (Request GSM Packet 0x5072 On Failure Events)
- 0x02030001: Active PSC
- 0x02030002: CM Call Event Orig
- 0x02030003: CM DS InterRat State
- 0x02030004: GPRS GRR Cell Resel
- 0x02030005: GPRS GRR Pkt Sys Info
- 0x02030006: GPRS RLC-DL Stats
- 0x02030007: GPS Position
- 0x02030008: GSM L1 Serving Cell Info
- 0x02030009: GSM Message Sent/Received
- 0x0203000A: GSM Random Access Request
- 0x0203000B: GSM RR Cell Info
- 0x0203000C: GSM RR Channel Config
- 0x0203000D: GSM RR SACH Report
- 0x0203000E: GSM Status Request
- 0x0203000F: GSM Surround Cell BA List
- 0x02030010: MM State
- 0x02030011: MO SMS Status
- 0x02030012: MT SMS Notify
- 0x02030013: NAS Message Sent/Received
- 0x02030014: RRC Message Sent/Received
- 0x02030015: SMS Statistics
- 0x02030016: UMTS AGC
- 0x02030017: UMTS Calls Statistics
- 0x02030018: UMTS Finger TA
- 0x02030019: UMTS List Search
- 0x0203001A: WCDMA Cell ID
- 0x0203001B: WCDMA Page Received Call Drop Details—Group 1 (Request GSM Packet 0x50720n Failure Events)
- 0x02040001: Active PSC
- 0x02040002: CM Call Event Orig
- 0x02040003: CM DS InterRat State
- 0x02040004: GPRS GRR Cell Resel
- 0x02040005: GPRS GRR Pkt Sys Info
- 0x02040006: GPRS RLC-DL Stats
- 0x02040007: GPS Position
- 0x02040008: GSM L1 Serving Cell Info
- 0x02040009: GSM Message Sent/Received
- 0x0204000A: GSM Random Access Request
- 0x0204000B: GSM RR Cell Info
- 0x0204000C: GSM RR Channel Config
- 0x0204000D: GSM RR SACH Report
- 0x0204000E: GSM Status Request
- 0x0204000F: GSM Surround Cell BA List
- 0x02040010: MM State
- 0x02040011: MO SMS Status
- 0x02040012: MT SMS Notify
- 0x02040013: NAS Message Sent/Received
- 0x02040014: RRC Message Sent/Received
- 0x02040015: SMS Statistics
- 0x02040016: UMTS Finger TA
- 0x02040017: UMTS AGC
- 0x02040018: UMTS Calls Statistics
- 0x02040019: UMTS List Search
- 0x0204001A: WCDMA Cell ID Handover Details—Group 1 (Request GSM Packet 0x50720n Failure Events)
- 0x02050001: WCDMA<->GSM Handover
- 0x02050002: WCDMA Inter Rat HO Start Out of Service Details—Group 1 (Request GSM Packet 0x5072 On Failure Events)
- 0x02060001: Active PSC
- 0x02060002: CM State Information
- 0x02060003: Event SD Event Action
- 0x02060004: GPRS GRR Cell Resel
- 0x02060005: GPRS GRR Pkt Sys Info
- 0x02060006: GPRS RLC-DL Stats
- 0x02060007: GPS Position
- 0x02060008: GSM L1 Serving Cell Info
- 0x02060009: GSM RR Cell Info
- 0x0206000A: GSM RR Channel Config
- 0x0206000B: GSM RR SACH Report
- 0x0206000C: GSM Status Request
- 0x0206000D: GSM Surround Cell BA List
- 0x0206000E: UMTS AGC
- 0x0206000F: UMTS Finger TA
- 0x02060010: UMTS List Search
- 0x02060011: WCDMA Cell ID Access Failure Details—Group 2 (Request GSM Packet 0x5072 Every Second)
- 0x02070001: Active PSC
- 0x02070002: CM Call Event Orig
- 0x02070003: CM DS InterRat State
- 0x02070004: GPRS GRR Cell Resel
- 0x02070005: GPRS GRR Pkt Sys Info
- 0x02070006: GPRS RLC-DL Stats
- 0x02070007: GPS Position
- 0x02070008: GSM L1 Serving Cell Info(C)
- 0x02070009: GSM Message Sent/Received
- 0x0207000A: GSM RR Cell Info
- 0x0207000B: GSM RR Channel Config
- 0x0207000C: GSM RR SACH Report
- 0x0207000D: GSM Random Access Request
- 0x0207000E: GSM Status Request
- 0x0207000F: GSM Surround Cell BA List
- 0x02070010: MM State
- 0x02070011: MO SMS Status
- 0x02070012: MT SMS Notify
- 0x02070013: NAS Message Sent/Received
- 0x02070014: RRC Message Sent/Received
- 0x02070015: SMS Statistics
- 0x02070016: UMTS AGC
- 0x02070017: UMTS Calls Statistics
- 0x02070018: UMTS Finger TA
- 0x02070019: UMTS List Search
- 0x0207001A: WCDMA Cell ID
- 0x0207001B: WCDMA Page Received Call Drop Details—Group 2 (Request GSM Packet 0x5072 Every Second)
- 0x02080001: Active PSC
- 0x02080002: CM Call Event Orig
- 0x02080003: CM DS InterRat State
- 0x02080004: GPRS GRR Cell Resel
- 0x02080005: GPRS GRR Pkt Sys Info
- 0x02080006: GPRS RLC-DL Stats
- 0x02080007: GPS Position
- 0x02080008: GSM L1 Serving Cell Info(C)
- 0x02080009: GSM Message Sent/Received 0x0208000A: GSM RR Cell Info
0x0208000B: GSM RR Channel Config
0x0208000C: GSM RR SACH Report
0x0208000D: GSM Random Access Request
0x0208000E: GSM Status Request
0x0208000F: GSM Surround Cell BA List
0x02080010: MM State
0x02080011: MO SMS Status
0x02080012: MT SMS Notify
0x02080013: NAS Message Sent/Received
0x02080014: RRC Message Sent/Received
0x02080015: SMS Statistics
0x02080016: UMTS Finger TA
0x02080017: UMTS AGC
0x02080018: UMTS Calls Statistics
0x02080019: UMTS List Search
0x0208001A: WCDMA Cell ID Handover Details—Group 2 (Request GSM Packet 0x5072 Every Second)
0x02090001: WCDMA<->GSM Handover
0x02090002: WCDMA Inter Rat HO StartOut of Service Details—Group 2 (Request GSM Packet 0x5072 Every Second)
0x02A0001: Active PSC
0x020A0002: CM State Information
0x020A0003: Event SD Event Action
0x020A0004: GPRS GRR Cell Resel
0x020A0005: GPRS GRR Pkt Sys Info
0x020A0006: GPRS RLC-DL Stats
0x020A0007: GPS Position
0x020A0008: GSM L1 Serving Cell Info(C)
0x020A0009: GSM RR Cell Info
0x020A000A: GSM RR Channel Config
0x020A000B: GSM RR SACH Report
0x020A000C: GSM Status Request
0x020A000D: GSM Surround Cell BA List
0x020A000E: UMTS AGC
0x020A000F: UMTS Finger TA
0x020A0010: UMTS List Search
0x020A0011: WCDMA Cell ID Call Setup Time
0x020B0001: MO Calls
0x020B0002: MT Calls Cell Reselection
0x020C0001: GSM to GSM
0x020C0002: GSM to WCDMA
0x020C0003: WCDMA to GSM
0x020C0004: WCDMA to WCDMA Continuous collection
0x020D0001: NAS Signaling
0x020D0002: RRC Signaling PSC Scanner
0x020E0001: PSC Scanner On
0x020E0002: PSC Scanner Off It should be noted that the above-listed examples are not to be considered limiting, and the present aspects are operable with any codes, messages, and data packets of any protocol.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, present aspects provide for methods, devices, systems and computer program products for requesting wireless device performance data and providing an optimal file size for the performance data. Specifically, present aspects provide for estimating the size of requested performance data, at the time of the request, and assessing other factors, such as requesting party preferences, to determine optimal performance data file size. Typically, multiple files of optimal size are created with each file including a portion of the requested performance data. In this regard, the performance data service provider is able to prepare and make accessible optimally sized performance data files, as the data becomes available as opposed to creating one comprehensive performance data file when all of the requested data is available. By making optimally sized performance data files accessible to the requesting party as the data becomes available, the requesting party is able to process and use the data at any earlier point in time. In addition, smaller optimally sized performance data files provide more efficiency in the communication network in terms of bandwidth utilization.

Additionally, some present aspects may provide for performance data requesting parties to implement Extensible Markup Language (XML) as the communication protocol between the requesting device and the performance data-supplying network entity. By implementing XML as the communication interface, the performance data supplier is able to offer the requesting party a messaging mechanism that allows for reaching out and controlling the collection of performance data at the wireless devices via interface with the network device, such as a user manager server or the like.

Many modifications and other aspects will come to mind to one skilled in the art to which this invention pertains having the benefit of the teachings presented in the foregoing descriptions and the associated drawings. Therefore, it is to be understood that the aspect is not to be limited to the specific aspects disclosed and that modifications and other aspects are intended to be included within the scope of the appended claims. Although specific terms are employed herein, they are used in a generic and descriptive sense only and not for purposes of limitation. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for providing wireless communication device performance data of optimal file size, the method comprising:
 receiving a request for performance data monitored by one or more wireless communication devices;
 estimating a cumulative file size of the requested performance data based on a time period over which the requested performance data is requested;
 determining a first file size for segments of the requested performance data based on the estimated cumulative file size;
 generating files of the first size as segments of the requested performance data become available;
 storing the generated files in memory; and
 providing a requester access to each generated file as the files become available.

2. The method of claim 1, further comprising determining a readjusted file size for segments of the requested performance data based on network characteristics.

3. The method of claim 2, wherein determining a readjusted file size further comprises determining a readjusted file size for segments of the requested performance data based on network characteristics determined at a time prior to a requester being provided access to each generated file.

4. The method of claim 1, wherein the estimating further comprises estimating based on each performance data configuration of the one or more wireless communication devices.

5. The method of claim 1, wherein determining a first file size further comprises determining a requester preference related to file size.

6. The method of claim 5, wherein determining a requester preference related to file size further comprises determining at least one requester preference chosen from the group consisting of file size and time between accesses to generated files.

7. The method of claim 1, wherein determining a first file size further comprises determining network characteristics.

8. The method of claim 7, wherein determining a first file size further comprises determining available network bandwidth.

9. The method of claim 1, wherein receiving a request for performance data monitored by one or more wireless communication devices further comprises receiving an Extensible Markup Language (XML) protocol formatted request for performance data.

10. The method of claim 1, wherein receiving a request for performance data monitored by one or more wireless communication devices further comprises receiving performance data configuration for the one or more wireless communication devices.

11. The method of claim 1, wherein receiving a request for performance data monitored by one or more wireless communication devices further comprises receiving one or more requester preferences for determining file size.

12. The method of claim 1, wherein storing the generated files in memory further comprises storing the generated files in memory at a network site, wherein each generated file has a corresponding Uniform Resource Locator (URL).

13. The method of claim 1, wherein providing a requester access to each generated file as the files become available further comprises providing a requester the URL corresponding to a generated file for accessing the generated file as the file becomes available.

14. The method of claim 1, wherein providing a requester access to each generated file as the files become available further comprises communicating each generated file to the requester as the files become available.

15. At least one processor configured for providing wireless communication device performance data of optimal file size, comprising:
 a first module for receiving a request for performance data monitored by one or more wireless communication devices;
 a second module, stored in a memory, for estimating a cumulative file size of the requested performance data based on a time period over which the requested performance data is requested;
 a third module for determining a first file size for segments of the requested performance data based on the estimated cumulative file size;
 a fourth module for generating files of the first size as segments of the requested performance data become available;
 a fifth module for storing the generated files in memory; and
 a sixth module for providing a requester access to each generated file as the files become available.

16. A computer program product, stored on a non-transitory computer-readable storage medium, comprising:
 a first set of codes for causing a computer to receive a request for performance data monitored by one or more wireless communication devices;
 a second set of codes for causing the computer to estimate a cumulative file size of the requested performance data based on a time period over which the requested performance data is requested;
 a third set of codes for causing the computer to determine a first file size for segments of the requested performance data based on the estimated cumulative file size;
 a fourth set of codes for causing the computer to generate files of the first size as segments of the requested performance data become available;
 a fifth set of codes for causing the computer to store the generated files in memory; and
 a sixth set of codes for causing the computer to provide a requester access to each generated file as the files become available.

17. A wireless communication device, comprising:
 means for receiving a request for performance data monitored by one or more wireless communication devices;

means for estimating a cumulative file size of the requested performance data based on a time period over which the requested performance data is requested;

means for determining a first file size for segments of the requested performance data by based on the estimated cumulative file size;

means for generating files of the first size as segments of the requested performance data become available;

means for storing the generated files in memory; and means for providing a requester access to each generated file as the files become available.

18. A network device, comprising:

a computer platform including a processor and a memory;

a communications module in communication with the processor and operable to receive a request for performance data monitored by one or more wireless communication devices;

an optimal file size determiner module stored in the memory, executable by the processor and operable to:
  estimate a cumulative file size of the requested performance data based on a time period over which the requested performance data is requested; and
  determine a first file size for segments of the requested performance data based on the estimated cumulative file size;

a file generator logic stored in the memory, executable by the processor and operable to generate files of the first size as segments of the requested performance data become available; and a file access logic stored in the memory, executable by the processor and operable to provide a requester access to each generated file as the file becomes available.

19. The network device of claim 17, wherein the optimal file size determiner module is further operable to readjust the first file size for segments of the requested data based on network characteristics.

20. The network device of claim 19, wherein the optimal file size determiner module is further operable to readjust the first file size for segments of the requested data based on network characteristics determined at a time prior to a requester being granted access to each generated file.

21. The network device of claim 18, wherein the optimal file size determiner module is further operable to estimate the cumulative file size of the requested performance data based on each performance data configuration of the one or more wireless communication devices.

22. The network device of claim 18, wherein the optimal file size determiner module is further operable to determine a first file size for segments of the requested performance data based on a requester preference.

23. The network device of claim 18, wherein optimal file size determiner module operable to determine a first file size for segments of the requested performance data based on a requester preference further defines the requester preference as chosen from the group consisting of file size and time between access to generated files.

24. The network device of claim 18, wherein the optimal file size determiner module is further operable to determine an a first file size for segments of the requested performance data based on available network bandwidth.

25. The network device of claim 18, wherein the communications module is further operable to receive an Extensible Markup Language (XML) formatted request for performance data.

26. The network device of claim 18, wherein the communications module is further operable receive performance data configuration for the one or more wireless communication devices.

27. The network device of claim 18, wherein the communications module is further operable to receive one or more requester preferences for determining optimal file size.

28. The network device of claim 18, wherein the file access logic is further operable to provide a requester a Uniform Resource Locator (URL) associated with a file for accessing a generated file as the file becomes available.

29. The network device of claim 18, wherein the file access logic is further operable to communicate each generated file to the requester as the files become available.

* * * * *